(12) United States Patent
Goldstein

(10) Patent No.: US 11,965,538 B2
(45) Date of Patent: Apr. 23, 2024

(54) NUT RESTRAINER, AND METHODS OF USE

(71) Applicant: Atlas Tube Connections, LLC, Chicago, IL (US)

(72) Inventor: Edward Goldstein, Douglaston, NY (US)

(73) Assignee: Atlas Tube Connections, LLC, Chicago, IL (US)

( * ) Notice: Subject to any disclaimer, the term of this patent is extended or adjusted under 35 U.S.C. 154(b) by 0 days.

(21) Appl. No.: 17/990,288

(22) Filed: Nov. 18, 2022

(65) Prior Publication Data

US 2023/0080304 A1    Mar. 16, 2023

Related U.S. Application Data

(63) Continuation of application No. 16/846,283, filed on Apr. 11, 2020, now Pat. No. 11,519,451.

(51) Int. Cl.
*F16B 39/282*    (2006.01)

(52) U.S. Cl.
CPC .................. *F16B 39/282* (2013.01)

(58) Field of Classification Search
CPC .......... F16B 37/02; F16B 37/14; F16B 39/08; F16B 39/10; F16B 39/282
USPC ... 29/190, 191, 196, 197, 204, 372.5–372.6, 29/525.02; 411/190, 191, 196, 197, 204, 411/372.5–372.6
See application file for complete search history.

(56) References Cited

U.S. PATENT DOCUMENTS

| | | | | |
|---|---|---|---|---|
| 2,219,451 A | * | 10/1940 | McCormick | F16B 39/08 411/524 |
| 2,495,037 A | | 1/1950 | Tinnerman | |
| 3,965,954 A | | 6/1976 | Lofredo | |
| 4,462,731 A | * | 7/1984 | Rovinsky | F16B 37/0892 411/433 |
| 4,659,273 A | * | 4/1987 | Dudley | F16B 41/005 411/429 |
| 4,890,967 A | * | 1/1990 | Rosenbaum | F16B 37/14 411/910 |
| 5,082,409 A | * | 1/1992 | Bias | F16B 37/14 411/372.5 |
| 5,606,753 A | * | 3/1997 | Hashimoto | F16B 39/32 411/7 |

(Continued)

FOREIGN PATENT DOCUMENTS

EP        1741938 A1    1/2007

OTHER PUBLICATIONS

U.S. Appl. No. 16/846,283, filed Apr. 11, 2020.
(Continued)

*Primary Examiner* — Roberta S Delisle
(74) *Attorney, Agent, or Firm* — BakerHostetler

(57) ABSTRACT

In accordance with one or more embodiments of the invention, nut restrainers and methods of use are presented, particularly as they apply to high-strength bolted connections for steel structures. Nut restrainers may define a cavity that accepts insertion of a nut, and may include deformable or removable centering elements that allow the nut to move laterally to accept a bolt that is inserted non-concentrically with the nut restrainer, and may comprise a mobile central portion and a rigid outer portion; A method of positioning a nut restrainer concentric with a bolt hole accurate to within the radial tolerance of the bolt hole.

20 Claims, 19 Drawing Sheets

(56) References Cited

U.S. PATENT DOCUMENTS

| | | | | |
|---|---|---|---|---|
| 5,857,818 | A * | 1/1999 | Bias, Sr. | F16B 37/14 411/429 |
| 6,053,681 | A * | 4/2000 | Mattershead | F16B 37/14 411/374 |
| 6,238,158 | B1 * | 5/2001 | Clements | F16B 37/14 411/372.6 |
| 6,293,744 | B1 * | 9/2001 | Hempfling | F16B 43/001 411/372.5 |
| 7,147,418 | B2 | 12/2006 | Clinch et al. | |
| 9,879,711 | B2 * | 1/2018 | Liu | B60B 7/02 |
| 10,040,568 | B2 * | 8/2018 | Rebbeck | B64D 45/02 |
| 11,225,993 | B2 * | 1/2022 | Goldstein | F16B 39/02 |
| 11,519,451 | B2 * | 12/2022 | Goldstein | F16B 37/044 |
| 2013/0294861 | A1 | 11/2013 | Wiffen | |
| 2015/0300400 | A1 * | 10/2015 | Lieven | F16B 39/28 411/372.6 |
| 2021/0131477 | A1 | 5/2021 | Goldstein | |

OTHER PUBLICATIONS

International Patent Application No. PCT/US2021/025927; Int'l Search Report and the Written Opinion; dated Sep. 10, 2021; 17 pages.

* cited by examiner

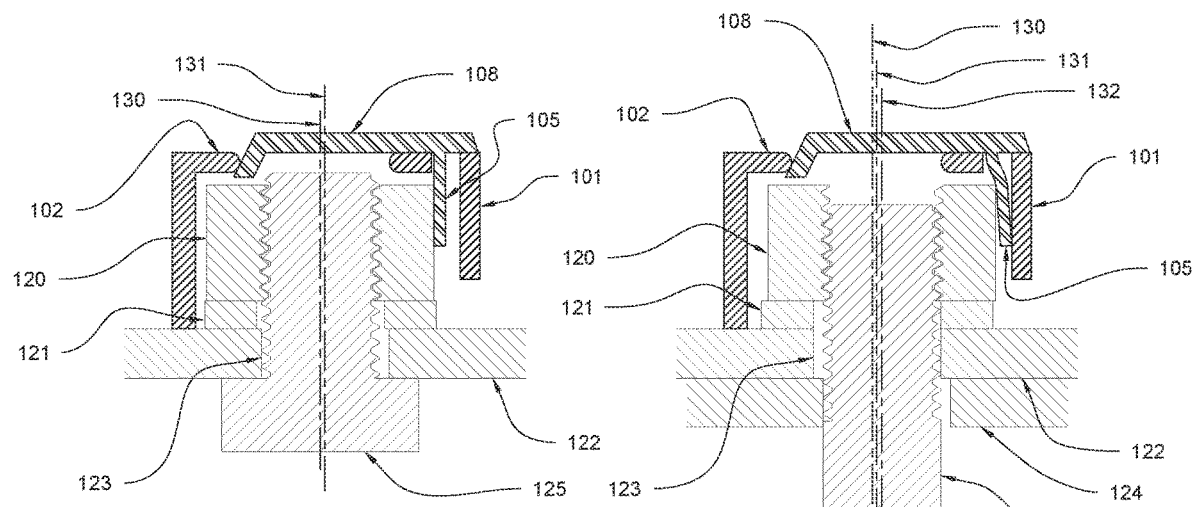
FIG. 9a
FIG. 9b
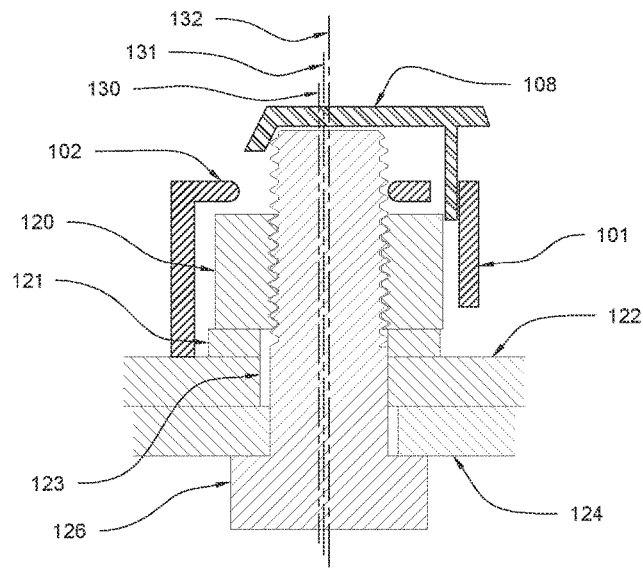
FIG. 9c

NUT RESTRAINER, AND METHODS OF USE

CROSS-REFERENCE TO RELATED APPLICATIONS

This application claims the benefit of U.S. application Ser. No. 16/846,283 filed on Apr. 11, 2020, now U.S. Pat. No. 11,519,451 issued Dec. 6, 2022, which is hereby incorporated by reference in its entirety for all purposes as if fully set forth herein.

BACKGROUND OF THE INVENTION

Field of Invention

The invention disclosed herein generally relates to high strength bolted connections. More specifically, the invention disclosed herein relates to nut restrainers, and methods of use.

Description of Related Art

Use of high-strength bolted connections (including, for example, bolts conforming to ASTM F3125, nuts conforming the ASTM A563, and washers conforming to ASTM F436) is widespread in the construction industry to join steel elements of buildings, bridges and other structures. Bolted assembly is often preferred to the use of welding due to the simplicity and speed of installing bolts on a construction site. However, proper installation of high-strength bolted connections typically requires access to both sides of the parts being connected, making the use of high strength bolts impossible in many cases. In other cases, engineers may sacrifice material efficiency to facilitate the use of bolted connections, for example, by using steel members with I-shaped cross-sections instead of those with more efficient box-shaped cross sections.

Nut restrainers, nut cages, and similar products have been widely used in applications including sheet metal fabrication, but currently available nut restrainers have drawbacks that prevent wide adoption within the steel constructions industry. First, many building codes include or reference prescriptive standards regarding the size, shape, and material properties of nuts, bolts, washers and holes, as well as spatial relations within the connection, methods of installation, and methods of inspection. Hardware or practices that do not conform to those prescriptive standards may require additional testing, approvals and training to be used in conformance with the applicable building code, thus increasing the cost to the installer. Thus, for any nut restrainer to be widely adopted in the construction industry, it must be compatible with standard industry, hardware and practices.

Second, tolerances during structural member fabrication, and variability in the size and shape of structural members, either due to temperature variations or external forces imposed on the member at the time of erection, mean that a restrained nut must be able to accept a bolt inserted non-concentrically with the nut. While several inventions have sought to address this issue using "floating nuts," these inventions generally include custom nuts or bolts, rather than being compatible with readily available hardware, severely limiting their adoption by the construction industry.

In the absence of nut restrainers well suited to the needs of the construction industry, several other products and practices exist to address the need for bolted connections when access is available from one side only. However, all suffer from drawbacks when compared to typical high strength bolting. These include the following three products and practices:

Welding a nut to the inaccessible side of the part in advance of site assembly. This approach allows the bolt to be tightened from one side but violates standards commonly referenced by building codes, which state that nuts conforming to ASTM A563 shall not be welded. This practice also reduces installation tolerances by fixing the nut's location with respect to the bolt hole.

Blind bolts, which come in a variety of proprietary and non-proprietary forms, can be installed and tightened from one side, but generally have smaller allowable load-carrying capacities than traditional high strength bolted connections. Blind bolts are generally more complex and expensive than high strength bolts, and typically cannot be used in connections where the bolt must tightly clamp the pieces of steel being joined, also known as slip critical connections.

Tapped holes have threads cut into the interior of the hole in the material on the inaccessible side. This approach requires high precision, increases fabrication time, reduces installation tolerances, and typically cannot be used in connections where the bolt must tightly clamp the pieces of steel being joined.

The existence of a product that allowed for the installation of high strength bolted connections from one side at low cost, without reductions in load-carrying capacity, and while preserving installation tolerances, would allow more efficient structures to be erected at a lower cost than is possible with current practice.

BRIEF SUMMARY OF EMBODIMENTS OF THE INVENTION

In accordance with one or more embodiments of the invention, nut restrainers and methods of use are disclosed. Certain aspects include a nut restrainer for inserting a nut within the nut restrainer and thereafter affixing the nut restrainer to a substrate plate having two sides, over a bolt hole having a radial tolerance, for subsequent installation of a bolt having a shank and a tip, from the side of the substrate plate opposite the side to which the nut restrainer is affixed, the nut restrainer comprising: a portion of one or more materials formed to define a cavity, and including a top plane disposed away from the substrate plate, and an open end; the cavity configured to accept insertion of a nut, with the one or more materials formed to define the cavity shaped to rotationally restrain the nut, and to include at least one location from which the nut has freedom of movement in any lateral direction equal to at least two times the radial tolerance of the bolt hole; the nut restrainer including one or more nut centering elements comprising one or more portions of removable or deformable material which extend into the cavity, and which are configured to hold the nut in a location from which the nut has freedom of movement in any lateral direction substantially equal to at least two times the radial tolerance of the bolt hole, and which may be removed or deformed so as to no longer extend into the cavity following affixment of the nut restrainer to the substrate plate, thereby allowing the nut move in any lateral direction to accept the bolt if the bolt is inserted non-concentrically with respect to the nut; where the nut restrainer is configured to prevent escape of the nut from the cavity following affixment to the substrate plate; and where no portion of the nut restrainer prevents direct contact between the nut and the substrate plate, or between the shank of the bolt and either the substrate plate or one or more fastened plates.

Some aspects include a nut restrainer for inserting a nut within the nut restrainer and thereafter affixing the nut restrainer to a substrate plate having two sides, over a bolt hole having a radial tolerance, for subsequent installation of a bolt having a shank and a tip, from the side of the substrate plate opposite the side to which the nut restrainer is affixed, the nut restrainer comprising: one or more rigid outer portions and a mobile central portion; the mobile central portion formed to define a cavity, and including a top plane disposed away from the substrate plate, and an open end; the cavity configured to accept insertion of a nut, with the material of the mobile central portion that defines the cavity shaped to rotationally restrain the nut; the one or more rigid outer portions, which include the portions of the nut restrainer that are affixed to the substrate plate, configured so that the mobile central portion has freedom of movement in any lateral direction substantially equal to at least two times the radial tolerance of the bolt hole; the one or more rigid outer portions and the mobile central portion being connected by one or more flexible connectors, which are sufficiently stiff and strong to substantially prevent movement of the mobile central portion in all lateral directions when one or more of the nut and the mobile central portion are acted on by forces in any lateral direction with magnitudes not exceeding the magnitude of the force acting on the respective element due to gravity, and sufficiently strong to rotationally restrain the mobile central portion when the mobile central portion is acted on by a torque due to the action of tightening the bolt with the nut, and sufficiently flexible to deform when the nut is acted on by a force in a lateral direction due to contact between the tip of the bolt and the nut, thereby allowing the nut to move in a lateral direction to accept the bolt if the bolt is inserted non-concentrically with respect to the nut; where the nut restrainer is configured to prevent escape of the nut from the cavity following affixment to the substrate plate; and where no portion of the nut restrainer prevents direct contact between the nut and the substrate plate, or between the shank of the bolt and either the substrate plate or one or more fastened plates.

Some aspects include a nut restrainer for inserting a nut within the nut restrainer and thereafter affixing the nut restrainer to a substrate plate having two faces, over a bolt hole having a radial tolerance, for subsequent installation of a bolt having a shank and a tip, from the side of the substrate plate opposite the side to which the nut restrainer is affixed, the nut restrainer comprising: one or more rigid outer portions and a mobile central portion; the mobile central portion formed to define a cavity, and including a top plane disposed away from the substrate plate, and an open end; the cavity configured to accept insertion of a nut, with the material of the mobile central portion that defines the cavity shaped to rotationally restrain the nut; the mobile central portion further having one or more radial protrusions which extend away from the cavity; the one or more rigid outer portions, which include the portions of the nut restrainer that are affixed to the substrate plate, having one or more deformable protrusions, each having a tip; the deformable protrusions configured so that the tips of the deformable protrusions maintain contact with the mobile central portion prior to insertion of the bolt, and hold the mobile central portion in a location from which the mobile central portion has freedom of movement in any lateral direction substantially equal to at least two times the radial tolerance of the bolt hole; the deformable protrusions further being sufficiently stiff and strong to substantially prevent movement of the mobile central portion in all lateral directions when one or more of the nut and the mobile central portion are acted on by forces in any lateral direction with magnitudes not exceeding the magnitude of the force acting on the respective element due to gravity, and being sufficiently flexible to deform when the nut is acted on by a force in a lateral direction due to contact between the tip of the bolt and the nut, thereby allowing the nut to move in a lateral direction to accept the bolt if the bolt is inserted non-concentrically with respect to the nut; the rigid outer portions further having one or more raised elements that are free from contact with the substrate plate, the space between the raised elements and the substrate plate forming one or more recesses; the recesses and the radial protrusions of the mobile central portion being configured so that the radial protrusions fit into the recesses, and so that the mobile central portion is rotationally restrained in the counter-clockwise direction when viewed in a direction proceeding from the top plane to the open end, and so that the mobile central portion is prevented from moving away from the face of the substrate plate; where the nut restrainer is configured to prevent escape of the nut from the cavity following affixment to the substrate plate; and where no portion of the nut restrainer prevents direct contact between the nut and the substrate plate, or between the shank of the bolt and either the substrate plate or one or more fastened plates.

Some aspects include a method of positioning the nut restrainer concentrically with the bolt hole in the substrate plate accurate to within the radial tolerance of the bolt hole, the method comprising: inserting the nut into the nut restrainer; placing the open end of the nut restrainer in flush contact with the substrate plate, thereby preventing removal of the nut; inserting a bolt from the side of the substrate plate opposite the nut restrainer, through the bolt hole, and binding the bolt with the nut previously inserted into the nut restrainer, so that the bolt and the nut are in snug contact with the substrate plate; affixing the nut restrainer to the substrate plate; removing the bolt from the nut and withdrawing the bolt from the bolt hole in the substrate plate.

Some aspects include where the cavity is configured to accept insertion of a washer in addition to accepting insertion of the nut, and to provide the washer freedom of movement in any lateral direction at least equal to the radial tolerance of the bolt hole, and to prevent escape of the washer following affixment to the substrate plate. Some aspects further include where the nut restrainer is configured so that the nut is visible from outside the nut restrainer following affixment to the substrate plate. Some aspects further include where the cavity defines a substantially equiangular hexagon, and other aspects include where the cavity defines a substantially regular hexagon.

Some aspects include where the nut centering elements are sufficiently stiff and strong to substantially prevent movement of the nut in all lateral directions when the nut is acted on by a force in any lateral direction with a magnitude not exceeding the magnitude of the force acting on the nut due to gravity, and sufficiently flexible to deform when the nut is acted on by a force in a lateral direction due to contact between the tip of the bolt and the nut, thereby allowing the nut to move in a lateral direction within the nut restrainer to accept the bolt when the bolt is inserted non-concentrically the nut.

Some aspects include where the nut restrainer includes one or more washer centering elements, the washer centering elements comprising: one or more portions of deformable material, which extend into the cavity of the nut restrainer; and hold the washer substantially concentric with the nut restrainer; the washer centering elements being sufficiently stiff and strong to substantially prevent movement of the washer in all lateral directions when the washer is acted on by a force in any lateral direction with a magnitude not exceeding the magnitude of the force acting on the washer due to gravity, and sufficiently flexible to deform when the washer is acted on by a force in a lateral direction due to contact between the tip of the bolt and the washer, thereby allowing the washer to move in a lateral direction to accept the bolt if the bolt is inserted non-concentrically with respect to the washer.

Some aspects include where the nut centering elements are made of one or more of foam, cork, rubber, plastic and felt, and the balance of the nut restrainer is made of metal. Some aspects further include where the nut centering elements are contiguous with the balance of the nut restrainer, and the nut centering elements' deformability is attributable to their form and proportioning. Some aspects further include where the nut centering elements are attached to the balance of the nut restrainer using adhesive. Some aspects further include where the nut centering elements are attached to the balance of the nut restrainer by snapping one or more portions of material that include the nut centering elements into place.

Some aspects include where affixment of the nut restrainer to the substrate plate is by means of welding. Some aspects further include where the top plane includes a hole to allow the tip of the bolt to pass through the top plane after passing through the nut. Some aspects further include where the top plane includes a hole to allow the tip of the bolt to pass through the top plane after passing through the nut, the hole being shaped to bind with the one or more portions of material including the nut centering elements, and limit attachment of the one or more portions of material including the nut centering elements to a position from which the nut centering elements hold the nut in a position from which the nut has freedom of movement in any lateral direction substantially equal to at least two times the radial tolerance of the bolt hole.

Some aspects include where the raised elements and the deformable protrusions are distinct portions of material. Some aspects further include where the raised elements and the deformable protrusions comprise the same portions of material. Some aspects further include where the one or more rigid outer portions are made of metal, and the mobile inner portion is made of plastic.

Definitions

Central axis: Unless otherwise defined for a specific element, a line perpendicular to the substrate plate and passing through the center of rotational symmetry of referenced element (nut, fastening bolt, or substrate bolt hole). The presence of helical threads in a referenced element shall be ignored when determining the center of rotational symmetry.

Deformable Material: A material that is flexible or weak compared to the balance of the nut restrainer, and which may deform in response to the insertion of a bolt.

Direct Contact: Contact between two elements with no intervening material.

Downward View: Refers to a view looking towards the face of the substrate plate to which the nut restrainer is affixed, at an angle perpendicular to the face of the substrate plate.

Equilibrium location: Location of an element (nut, washer, or mobile central portion) when no force external to the nut restrainer is acting on the respective element, or, in the case of the mobile central portion, the element and its contents.

Escape: phenomenon whereby a referenced element ceases to be located within a second referenced element without being intentionally removed.

Final Configuration: The relative locations and internal forces and deformations characteristic of the nut restrainer, its constituent parts, hardware, substrate plate, and fastened plates following the installation and tightening of the fastening bolt.

Freedom of movement: A condition characterized by a lack of material included as part of the nut restrainer, that would by its presence, prevent the translation of the center of the referenced element (nut, washer, or a mobile central portion) in one or more specified directions. Freedom of movement may be bounded by the presence of material included as part of the nut restrainer that prevents the referenced element from moving beyond set limits. Where freedom of movement is said to be equal to a certain value in one or more directions, that value indicates the distance the referenced element may move from a specified initial location until contacting a portion of the nut restrainer that is not deformable or removable. If no initial position is specified, the initial position shah be considered to be the position occupied by the referenced element at the moment of affixment to the substrate plate. In embodiments that include one or more of deformable nut centering elements, removable nut centering elements, washer centering elements, flexible connectors, deformable protrusions, and raised deformable hold-downs, those elements shall not be considered to prevent the translation of the referenced element.

Hardware: Nuts, washers, and bolts, typically in readily available sizes.

Extending Into The Cavity: A state applicable to deformable nut centering elements, removable nut centering elements, or washer centering elements, whereby portions of the respective centering elements are collocated with portions of the cavity.

Lateral Direction: Any direction that is substantially parallel to the face of the substrate material to which the nut restrainer is affixed.

Cavity: Space surrounded or partially surrounded by material comprising the nut restrainer, in which no material comprising the nut restrainer is present, with the exception of any nut centering elements or washer centering elements, in embodiments that include nut centering elements or washer centering elements.

Nut Space: Portion of the cavity that accepts insertion of the nut. In embodiments that lack a washer space, the nut space and cavity are identical.

Nut Space Sidewalls: Portions of the nut restrainer surrounding or partially surrounding the nut space, which rotationally restrain the nut.

Radial Tolerance Of The Bolt Hole: A scalar quantity of length equal to the difference of the radius of a bolt hole and the radius of a bolt that is to be inserted into the bolt hole.

Regular Hexagon: Equiangular equilateral hexagon

Restrainer Central Axis: Line perpendicular to the substrate plate and passing through the centroid of the cavity.

Rotationally Restrain: Prevent the rotation of the referenced element (the nut or the mobile central portion) beyond a finite angular limit.

Snug contact: State whereby internal stresses within one or more of a plurality of referenced elements cause the elements to exert force on each other that tends to immobilize the referenced elements relative to each other, the exerted forces being small enough that the referenced elements can be moved relative to each other by a person without the use of tools.

Substantially Prevent Movement: limit movement of a referenced element due to a referenced force to a distance that has no deleterious effect on the function of the nut restrainer.

Washer Space: Substantially cylindrical portion of the cavity that accepts insertion of the washer.

Washer Space Sidewalls: Portions of the nut restrainer surrounding or partially surrounding the washer space.

BRIEF DESCRIPTION OF THE DRAWINGS

The inventions disclosed herein are nut restrainers and methods of use that allow for the installation of bolted connections with access from only one side by confining the nut within a nut restrainer that is affixed (by way of nonlimiting example, in some embodiments welded) to the substrate material in advance of erection of structures including in some embodiments steel.

FIGS. 1, 2, and 3 show various views of exemplary embodiments of the invention. FIGS. 2 and 3 show other views of the embodiment shown in FIGS. 1a and 1 b.

FIG. 2 shows downward and cross sectional views of an embodiment of the invention.

FIG. 3 shows cross-sectional views of an embodiment of the invention with hardware and other elements present, to show methods of alignment and use.

FIGS. 4, 5, and 6 show various views of an exemplary embodiment of the invention.

FIG. 5 shows downward and cross sectional views of an embodiment of the invention.

FIG. 6 shows cross-sectional views of an embodiment of the invention with hardware and other elements present, to show methods of alignment and use.

FIGS. 7, 8 and 9 show various views of an exemplary embodiment of the invention.

FIG. 8 shows downward and cross sectional views of an embodiment of the invention.

FIG. 9 shows cross-sectional views of an embodiment of the invention with hardware and other elements present, to show methods of alignment and use. FIG. 9a shows the embodiment at the moment of affixment to the substrate plate. FIG. 9b shows the embodiment during installation of the fastening bolt. FIG. 9c shows the embodiment after installation of the fastening bolt.

FIGS. 10, 11 and 12 show various views of an exemplary embodiment of the invention.

FIG. 11 shows downward and cross sectional views of an embodiment of the invention. FIGS. 11 b, 11 c, 11 d and 11 e show cross sections of the embodiment with hardware included.

FIG. 12 shows cross-sectional views of an embodiment of the invention with hardware and other elements present, to show methods of alignment and use.

FIGS. 13, 14 and 15 show various views of exemplary embodiments of the invention. FIGS. 14 and 15 show other views of the embodiment shown in FIG. 13 a.

FIG. 14 shows downward and cross sectional views of an embodiment of the invention.

FIG. 15 shows cross-sectional views of an embodiment of the invention with hardware and other elements present, to show methods of alignment and use.

FIGS. 16, 17 and 18 show various views of an exemplary embodiment of the invention.

FIG. 17 shows downward and cross sectional views of an embodiment of the invention with hardware included.

FIG. 18 shows cross-sectional views of an embodiment of the invention with hardware and other elements present, to show methods of alignment and use.

FIG. 19 shows various views of exemplary embodiments of the invention.

DETAILED DESCRIPTION OF EMBODIMENTS OF THE INVENTION

Figure 1A:
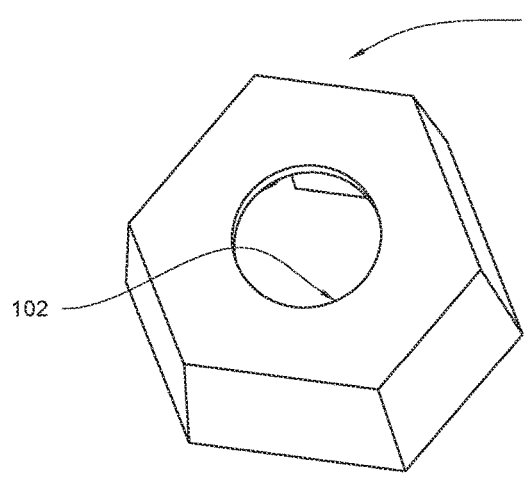
FIGS. 1a and 1b show three-dimensional views of an embodiment in isolation.
Figure 1B:
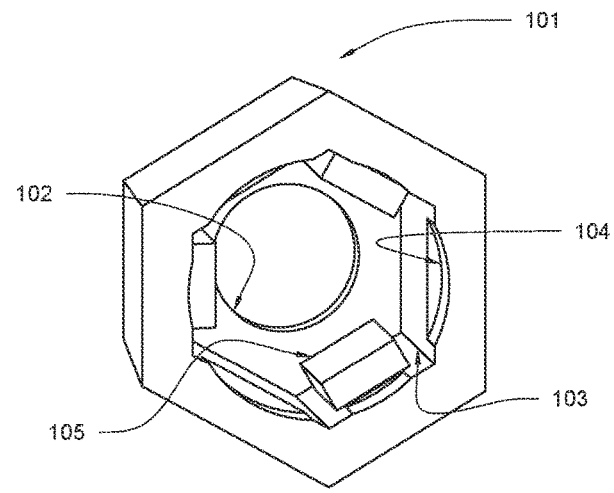
Figure 1C:
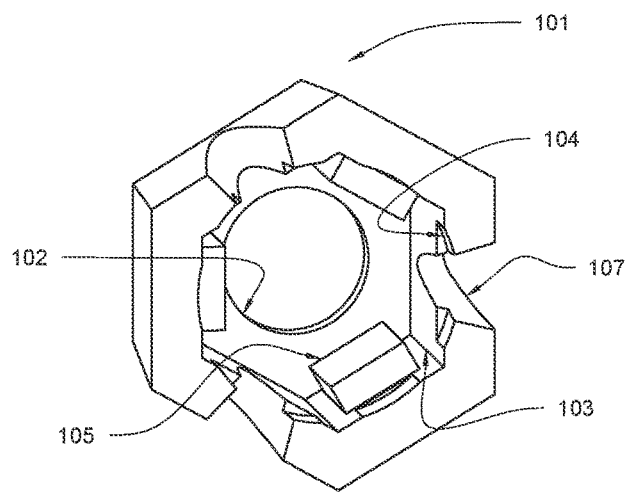
FIG. 1c shows a three-dimensional view of an embodiment similar to the embodiment shown in FIGS. 1a and 1b but with portions of material removed to make the contents of the restrainer visible.
Figure 2A:
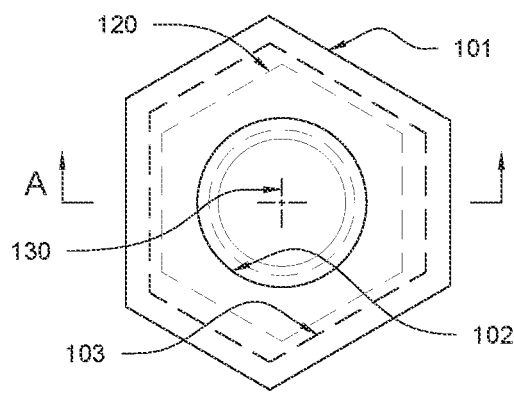
In FIGS. 2a, 2b, 2d and 2f, the embodiment is shown with hardware included, whereas in FIGS. 2c and 2e, the embodiment is shown in isolation.
Figure 2B:
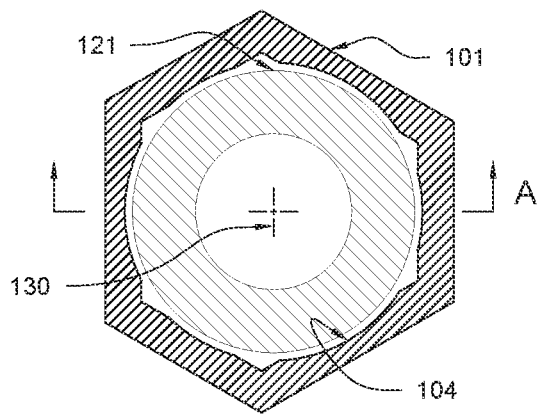
Figure 2C:
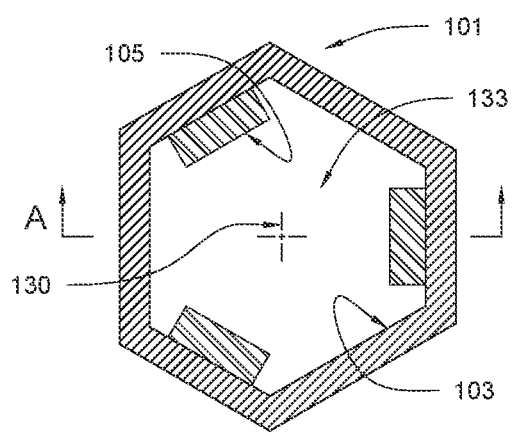
Figure 2D:
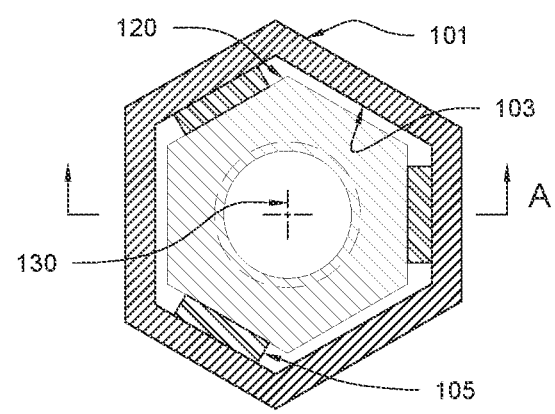
Figure 2E:
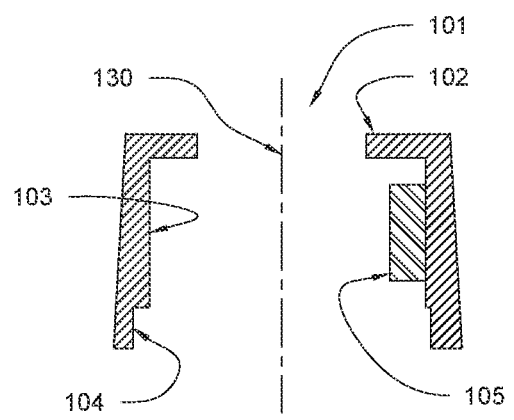
Figure 2F:
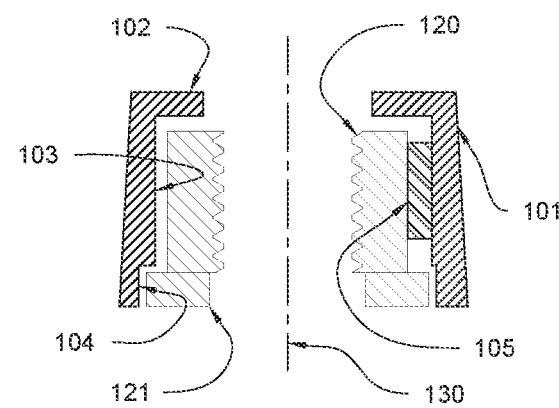
Figure 3A:
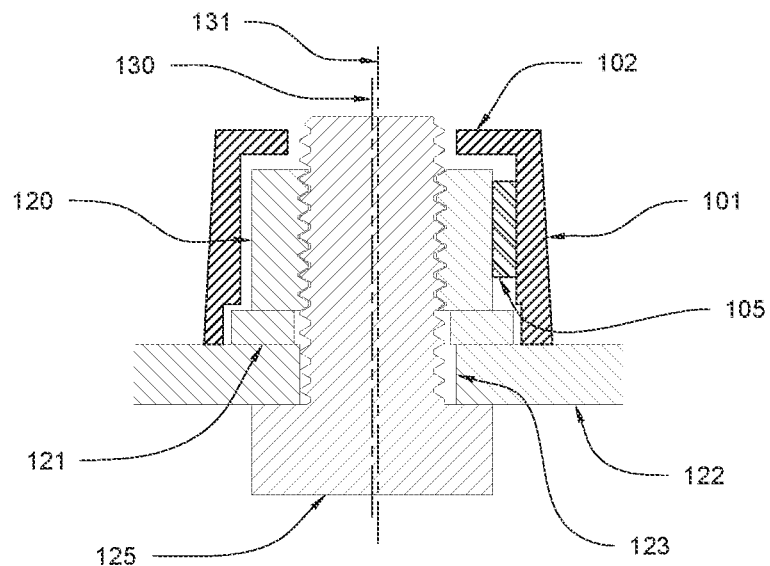
FIG. 3a shows the embodiment at the moment of affixment to the substrate plate.
Figure 3B:
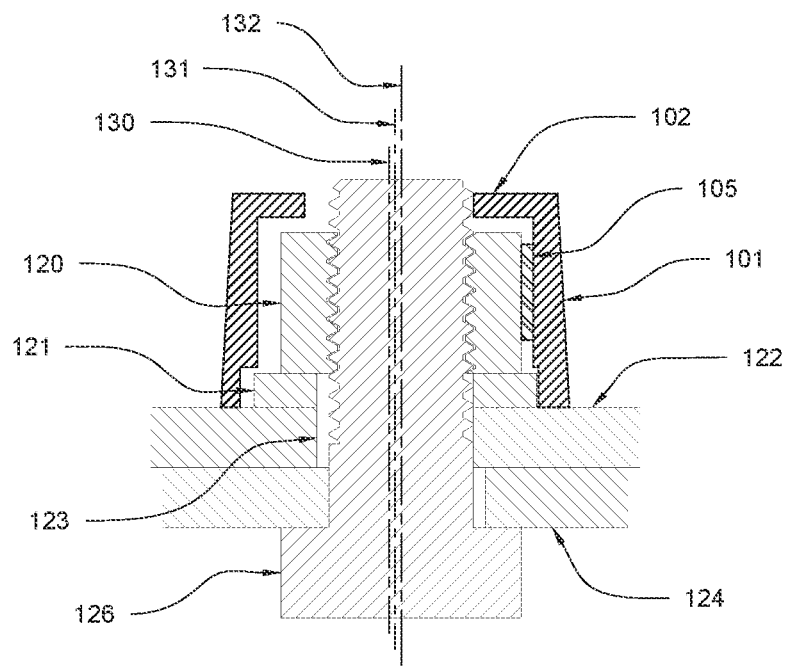
FIG. 3b shows the embodiment after installation of the fastening bolt.

FIGS. 1, 2, and 3 show various views of exemplary embodiments of the invention. FIGS. 1a and 1b show three-dimensional views of an embodiment in isolation, and FIG. 1c shows a three-dimensional view of an embodiment similar to the embodiment shown in FIGS. 1a and 1b but with portions of material removed to make the contents of the restrainer visible. FIGS. 2 and 3 show other views of the embodiment shown in FIGS. 1a and 1 b. FIG. 1a shows a three-dimensional view of nut restrainer 101 from the top and side. The embodiment shown in FIG. 1a includes a hole in top plane 102 that is located and dimensioned to allow the tip of fastening bolt 126 (shown in at least FIG. 3b) to pass through top plane 102 in cases where fastening bolt 126 extends past nut 120 (shown in at least FIG. 3b) in the final configuration, as shown in FIG. 3b. Nut restrainer 101 in this and other figures is depicted with sharp corners and edges for visual clarity, though production versions would likely have filleted corners and edges to facilitate manufacturing.

FIG. 1b shows a three-dimensional view of nut restrainer 101 from the bottom and side. The embodiment shown in FIG. 1b includes rectangular prism-shaped deformable nut centering elements 105 affixed to every other side of hexagonally shaped nut space sidewalls 103. Deformable nut centering elements 105 are configured to hold nut 120 (shown in at least FIG. 3b) substantially concentric with nut restrainer 101 prior to insertion of fastening bolt 126 (shown in at least FIG. 3b). Deformable nut centering elements 105 are formed and proportioned to be flexible compared to the balance of nut restrainer 101, allowing nut 120 to move in any lateral direction to accept fastening bolt 126 (shown in at least FIG. 3b) if fastening bolt 126 is inserted non-concentrically with nut restrainer 101. As shown in FIG. 1 b, deformable nut centering elements 105 can be made of a variety of materials including but not limited to foam, rubber, cork, or felt. In some embodiments, deformable nut centering elements 105 may be contiguous with the balance of nut restrainer 101, such as in the embodiment shown in FIGS. 10, 11 and 12. The relative locations of top plane 102, and washer space sidewall 104, are also shown.

FIG. 1c shows a three-dimensional view of nut restrainer 101 from the bottom and side. FIG. 1c is identical to FIG. 1 b, except that exemplary viewports 107 are shown. Viewports 107 are not required for proper functioning of nut restrainer 101, but have two main benefits. First, viewports 107 allow for visual confirmation of the presence or absence of nut 120 (shown in at least FIG. 3b), and washer 121 (shown in at least FIG. 3b), if present, following affixment of nut restrainer 101 to substrate plate 122 (shown in at least FIG. 3b). Second, viewports 107 reduce the amount of material required to produce nut restrainer 101. The relative locations of top plane 102, nut space sidewalls 103, and washer space sidewalls 104, and deformable nut centering elements 105 are also shown.

FIG. 2 shows downward and cross sectional views of an embodiment of the invention. In FIGS. 2a, 2b, 2d and 2f, the embodiment is shown with hardware included, whereas in FIGS. 2c and 2e, the embodiment is shown in isolation. FIG. 2a shows a downward view of nut restrainer 101 with nut 120 included. The relative locations of top plane 102, nut space sidewalls 103, and restrainer central axis 130 are also shown. The location of section cut plane A is shown in FIG. 2a, and is used in subsequent figures to identify the orientation of particular cross-sectional views. As shown in FIG. 2a, and all subsequent figures, hidden lines are indicated with uniform dashes, and centerlines are indicated with alternating long-short dashes.

FIG. 2b shows a downward cross-sectional view of nut restrainer 101 with washer 121 included. The cross section shown in FIG. 2b is cut through washer space sidewalls 104 of nut restrainer 101. The relative location of restrainer central axis 130 is also shown. The location of section cut plane A is shown in FIG. 2b, and is used in subsequent figures to identify the orientation of particular cross-sectional views.

FIG. 2c shows a downward cross-sectional view of nut restrainer 101 in isolation. The cross section shown in FIG. 2c is cut through nut space sidewalls 103 and deformable nut centering elements 105 of nut restrainer 101. As shown in FIG. 2c, the cross-section of nut space sidewalls 103 is an equiangular hexagon with unequal lengths, such that some sides of nut space sidewalls 103 are more distant from restrainer central axis 130 than others. Deformable nut centering elements 105 are affixed (by way of non-limiting example, in some embodiments using adhesive) to the more distant sides of the hexagon to provide sufficient clearance for nut 120 (shown in at least FIG. 2d) to move in any lateral direction a distance substantially equal to at least two times the radial tolerance of the bolt hole without requiring deformable nut centering elements 105 to compress to zero thickness. The relative location of cavity 133 is also shown. The location of section cut plane A is shown in FIG. 2c, and is used in subsequent figures to identify the orientation of particular cross-sectional views.

FIG. 2d shows a downward cross-sectional view of nut restrainer 101 with nut 120 inserted. The cross section shown in FIG. 2d is cut through nut space sidewalls 103 and deformable nut centering elements 105 of nut restrainer 101. As shown in FIG. 2d, nut space sidewalls 103 and deformable nut centering elements 105 are configured so that deformable nut centering elements 105 undergo compressive strain upon insertion of nut 120 (said strain is visible in FIG. 2d as a reduction in thickness of deformable nut centering elements 105 when compared to FIG. 2c.), thereby ensuring that nut 120 is in snug contact with deformable nut centering elements 105, and is substantially coaxial with nut restrainer central axis 130, even in cases where manufacturing inaccuracies result in non-nut space sidewalls 103 being larger than their theoretical dimensions, or in cases where manufacturing inaccuracies result in nut 120 being smaller than its theoretical dimensions. As shown in FIG. 2d, deformable nut centering elements 105 are sufficiently stiff and strong to hold nut 120 concentric with nut restrainer 101 when no force acting on nut 120 in a lateral direction exceeds the magnitude of the force imposed on nut 120 by gravity. In cases where fastening bolt 126 (shown in at least FIG. 3b) is inserted into nut restrainer 101 non-concentrically with nut restrainer 101, interaction between the tip of fastening bolt 126 and nut 120 will cause nut 120 to move in a lateral direction, further compressing one or more deformable nut centering elements 105, and allowing fastening bolt 126 to be tightened with nut 120. The location of section cut plane A is shown in FIG. 2d, and is used in subsequent figures to identify the orientation of particular cross-sectional views.

FIG. 2e shows a transverse cross-sectional view of nut restrainer 101 in isolation. The location and direction of the cross sectional view through nut restrainer 101 shown in FIG. 2e is indicated by section A, as shown in at least FIG.

2a. The relative locations of top plane 102, nut space sidewalls 103, washer space sidewalls 104, deformable nut centering elements 105, and restrainer central axis 130 are shown.

FIG. 2f shows a transverse cross-sectional view of nut restrainer 101 with nut 120 and washer 121 inserted. The location and direction of the cross sectional view through nut restrainer 101 as shown in FIG. 2f is indicated by section A, as shown in at least FIG. 2a. The relative locations of top plane 102, nut space sidewalls 103, washer space sidewalls 104, deformable nut centering elements 105, and restrainer central axis 130 are also shown.

FIG. 3 shows cross-sectional views of an embodiment of the invention with hardware and other elements present, to show methods of alignment and use. FIG. 3a shows the embodiment at the moment of affixment to the substrate plate. FIG. 3b shows the embodiment after installation of the fastening bolt. FIG. 3a shows a transverse cross-sectional view of nut restrainer 101 and other relevant elements at the moment of affixment to substrate plate 122. The location and direction of the cross sectional view through nut restrainer 101 shown in FIG. 3a is indicated by section A, as shown in at least FIG. 2a. As shown in FIG. 3a, the shank of centering bolt 125 is in contact with the walls of substrate bolt hole 123, so that substrate bolt hole central axis 131 and restrainer central axis 130 are offset by a distance substantially equal to the radial tolerance of the bolt hole. In some embodiments, centering bolt 125 and fastening bolt 126 (shown in at least FIG. 3b) may be the same bolt. However, in other cases, the lengths of threaded and unthreaded portions (if present) of the shank of fastening bolt 126 may prevent fastening bolt 126 from being brought into snug contact with nut 120 in the absence of fastened plate 124 (shown in at least FIG. 3b), necessitating the use of a distinct bolt as centering bolt 125. The relative locations of top plane 102, deformable nut centering elements 105, and washer 121 are also shown.

FIG. 3b shows a transverse cross-sectional view of nut restrainer 101 and other relevant elements after installation of fastening bolt 126. The location and direction of the cross sectional view through nut restrainer 101 shown in FIG. 3b is indicated by section A, as shown in at least FIG. 2a. As shown in FIG. 3b, fastened plate 124 is positioned such that the shank of fastening bolt 126 is in contact with the interior of substrate bolt hole 123, resulting in substrate bolt hole central axis 131 and fastening bolt central axis 132 being offset by a distance substantially equal to the radial tolerance of the bolt hole. Further, restrainer central axis 130 and fastening bolt central axis 132 are offset in substantially opposite directions from substrate bolt hole central axis 131, such that restrainer central axis 130 and fastening bolt central axis 132 are offset by a distance substantially equal to two times the radial tolerance of the bolt hole. To accommodate this worst-case misalignment, the nut space must provide freedom of movement to the nut substantially equal to at least two times the radial tolerance of the bolt hole in all lateral directions, and deformable nut centering elements 105 must be formed and proportioned to remain flexible when deformed by a distance up to two times the radial tolerance of the bolt hole. The relative locations of top plane 102, nut 120, washer 121, and substrate plate 122, are also shown.

Figure 4A:
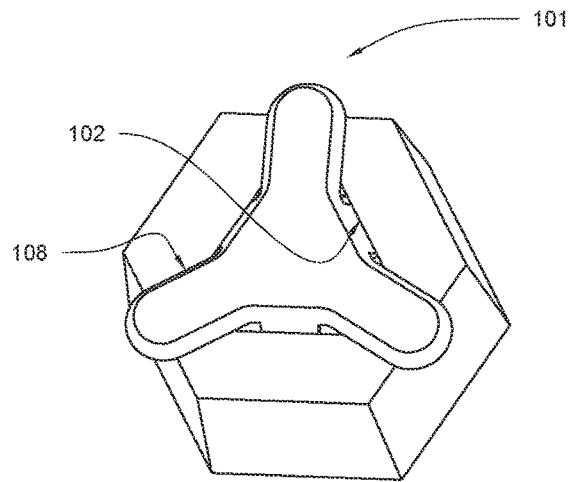
FIGS. 4a and 4b show three-dimensional views of the embodiment in isolation.
Figure 4B:
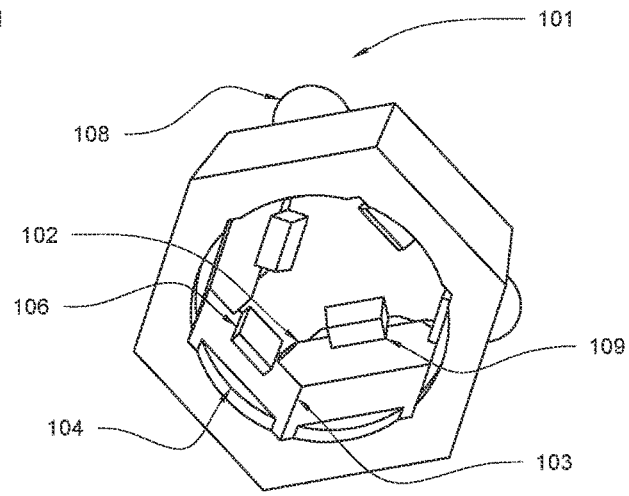

FIGS. 4, 5, and 6 show various views of an exemplary embodiment of the invention, FIGS. 4a and 4b show three-dimensional views of the embodiment in isolation. FIGS. 4c and 4d show elements of the embodiment in isolation to present aspects of the embodiment that are not easily visible when the embodiment is shown in its entirety. FIG. 4a shows a three-dimensional view of nut restrainer 101 from the top and side. The relative locations of top plane 102, and cap 108 are shown.

FIG. 4b shows a three-dimensional view of nut restrainer 101 from the bottom and side. Cap 108 as shown in FIG. 4b is removable and includes removable nut centering elements 106 that extend into the cavity of nut restrainer 101 to hold nut 120 (shown in at least FIG. 6b) substantially concentric with nut restrainer 101 until nut restrainer 101 has been affixed to substrate plate 122 (shown in at least FIG. 6b). Following affixment of nut restrainer 101 to substrate plate 122, and prior to insertion of fastening bolt 126 (shown in at least FIG. 6b), cap 108 is removed, thereby allowing nut 120 to move laterally within the nut space to accept fastening bolt 126 if fastening bolt 126 is inserted non-concentrically with nut restrainer 101. The relative locations of top plane 102, nut space sidewalls 103, washer space sidewalls 104, and snap-on protrusions 109 are also shown.

Figure 4C:
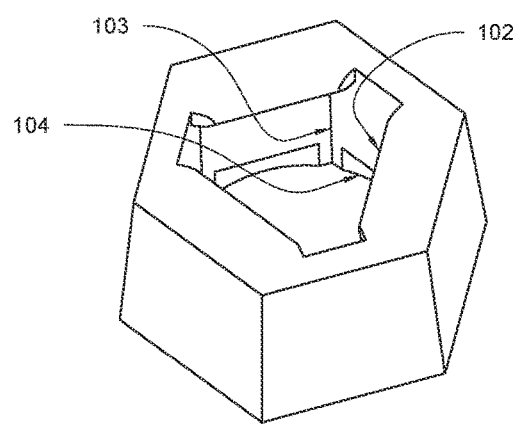
FIGS. 4c and 4d show elements of the embodiment in isolation to present aspects of the embodiment that are not easily visible when the embodiment is shown in its entirety.

FIG. 4c shows a three-dimensional view of nut restrainer 101 (shown in its entirety in at least FIG. 4a) from the top and side with cap 108 (shown in at least FIG. 4d) not present. As shown in FIG. 4c, some interior edges of top plane 102 are filleted to allow snap-on protrusions 109 (shown in at least FIG. 4d) of cap 108 to be easily snapped into place atop nut restrainer 101. The relative locations of nut space sidewalls 103, and washer space sidewalls 104 are also shown.

Figure 4D:
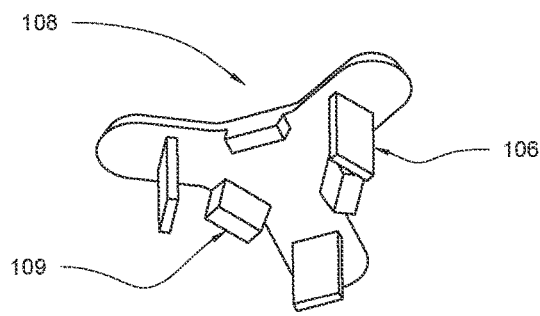

FIG. 4d shows a three-dimensional view of cap 108 in isolation from the bottom and side. As shown in FIG. 4d, cap 108 has at least four critical features: first, removable nut centering elements 106 are dimensioned and arranged to engage with at least three sides of nut 120 (shown in at least FIG. 6b), holding nut 120 concentric with nut restrainer 101 (shown in its entirety in at least FIG. 4a) until nut restrainer 101 has been affixed to substrate plate 122 (shown in at least FIG. 6b). Second, snap-on protrusions 109 are configured so that cap 108 may be snapped into place atop nut restrainer 101, engaging with top plane 102 (shown in at least FIG. 4c), Third, top plane 102 and snap-on protrusions 109 are configured to ensure that cap 108 may only be snapped into place in a position that restrains nut 120 substantially concentric with nut restrainer 101. Fourth, the tips of cap 108 extend beyond the edges of nut restrainer 101 to allow removal of cap 108 by hand following affixment of nut restrainer 101 to substrate plate 122.

FIG. 5 shows downward and cross sectional views of an embodiment of the invention. FIG. 5a shows a downward view of the embodiment in isolation. FIG. 5b shows a downward view of the embodiment with hardware included and the cap omitted. FIGS. 5c, 5d and 5e show cross sections of the embodiment with hardware included. FIG. 5a shows a downward view of nut restrainer 101 including cap 108. As shown in FIG. 5a, removable nut centering elements 106 are in flush contact with the interior face of nut space sidewalls 103. Embodiments of the invention where removable nut centering elements 106 are not in contact with an interior face of nut space sidewalls 103 are also envisioned, though such an embodiment would have larger overall dimensions and thus larger material demands than the embodiment of nut restrainer 101 as shown in FIG. 5a. Snap-on protrusions 109 and restrainer central axis 130 are also shown. The location of section cut plane B is shown in FIG. 5a, and is used in subsequent figures to identify the orientation of particular cross-sectional views.

Figure 5A:
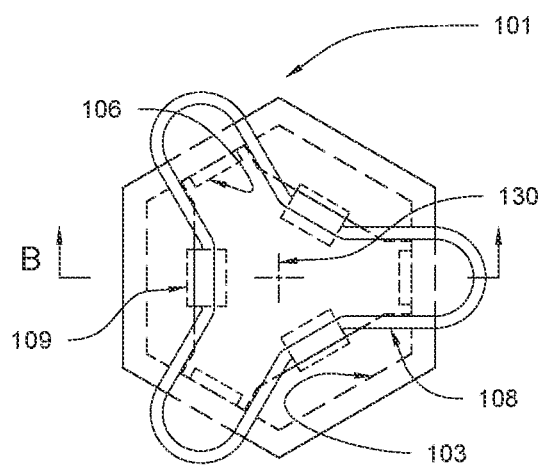
FIG. 5a shows a downward view of the embodiment in isolation.
Figure 5B:
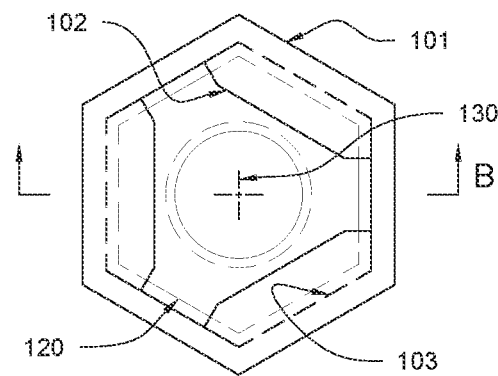
FIG. 5b shows a downward view of the embodiment with hardware included and the cap omitted.

FIG. 5b shows a downward view of nut restrainer 101 with cap 108 (shown in at least FIG. 5a) not present, and nut 120 included. Top plane 102, nut space sidewalls 103, and restrainer central axis 130 are also shown. The location of section cut plane B is shown in FIG. 5b, and is used in subsequent figures to identify the orientation of particular cross-sectional views.

Figure 5C:
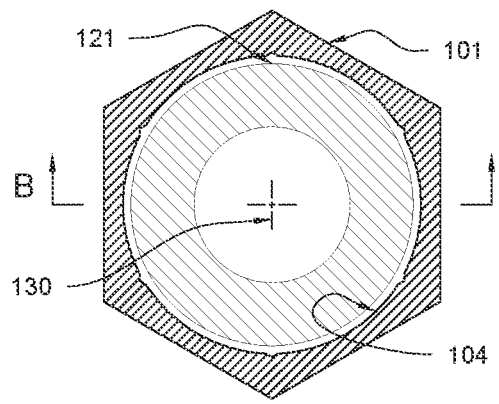
FIGS. 5c, 5d and 5e show cross sections of the embodiment with hardware included.

FIG. 5c shows a downward cross-sectional view of nut restrainer 101 with washer 121 included. The cross section shown in FIG. 5c is cut through washer space sidewalls 104 of nut restrainer 101. The relative locations of washer space sidewalls 104, washer 121, and restrainer central axis 130 are shown. The location of section cut plane B is shown in FIG. 5c, and is used in subsequent figures to identify the orientation of particular cross-sectional views.

Figure 5D:
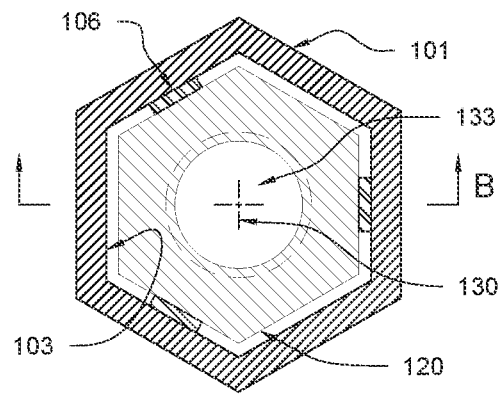

FIG. 5d shows a downward cross-sectional view of nut restrainer 101 with nut 120 inserted. The cross section shown in FIG. 5d is cut through nut space sidewalls 103 and removable nut centering elements 106 of nut restrainer 101. As shown in FIG. 5d, removable nut centering elements 106 are configured to hold nut 120 substantially concentric with nut restrainer 101 while cap 108 (shown in at least FIG. 5a) is attached to the balance of nut restrainer 101. The relative locations of nut restrainer central axis 130 and cavity 133 are also shown. The location of section cut plane B is shown in FIG. 5d, and is used in subsequent figures to identify the orientation of particular cross-sectional views.

Figure 5E:
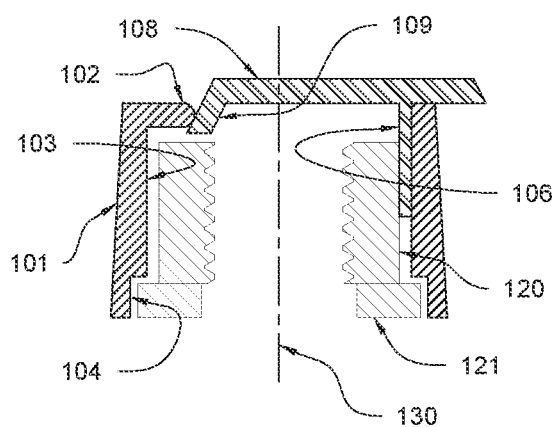

FIG. 5e shows a transverse cross-sectional view of nut restrainer 101 with nut 120 and washer 121 inserted. The location and direction of the cross sectional view through nut restrainer 101 as shown in FIG. 5e is indicated by section B, as shown in at least FIG. 5a. The relative locations of top plane 102, nut space sidewalls 103, washer space sidewalls 104, removable nut centering elements 106, cap 108, snap-on protrusions 109, and restrainer central axis 130 are also shown.

Figure 6A:
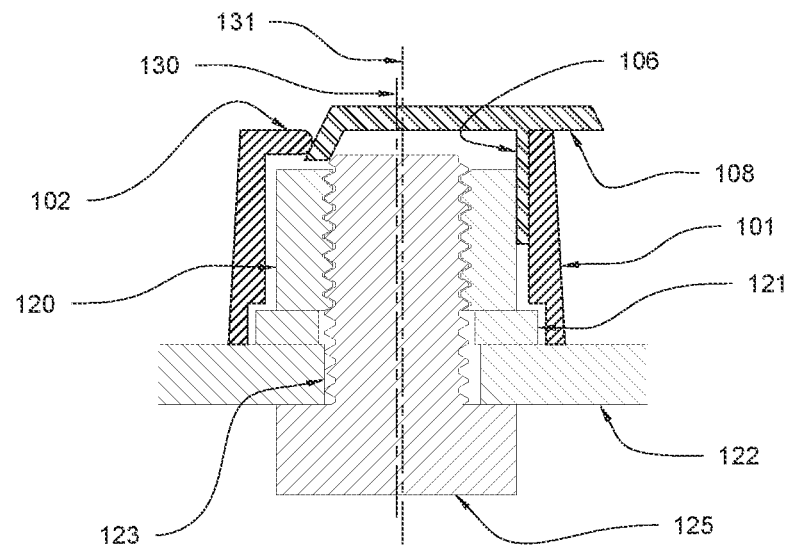
FIG. 6a shows the embodiment at the moment of affixment to the substrate plate.
Figure 6B:
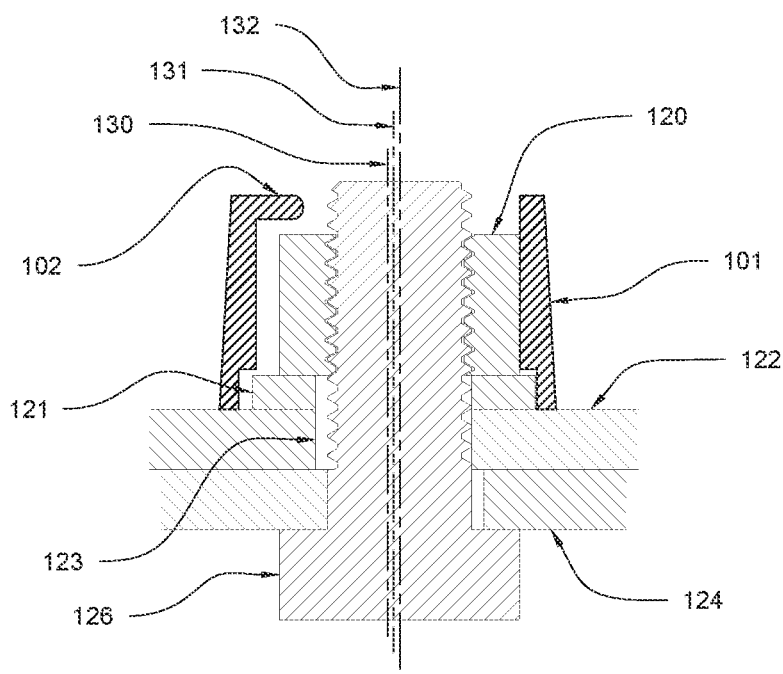
FIG. 6b shows the embodiment after installation of the fastening bolt.

FIG. 6 shows cross-sectional views of an embodiment of the invention with hardware and other elements present, to show methods of alignment and use. FIG. 6a shows the embodiment at the moment of affixment to the substrate plate. FIG. 6b shows the embodiment after installation of the fastening bolt. FIG. 6a shows a transverse cross-sectional view of nut restrainer 101 and other relevant elements at the moment of affixment to substrate plate 122. The location and direction of the cross sectional view through nut restrainer 101 shown in FIG. 6a is indicated by section B, as shown in at least FIG. 5a. As shown in FIG. 6a, the shank of centering bolt 125 is in contact with the walls of substrate bolt hole 123, so that substrate bolt hole central axis 131 and restrainer central axis 130 are offset by a distance substantially equal to the radial tolerance of the bolt hole. As shown in FIG. 6a, in some embodiments, centering bolt 125 is shorter than fastening bolt 126 (shown in at least FIG. 6b) because centering bolt 125 extending beyond nut 120 during the process of locating and affixing nut restrainer 101 to substrate plate 122 could dislodge cap 108 before nut restrainer 101 is affixed to substrate plate 122. In other embodiments of the invention, the distance from substrate plate 122 to top plane 102 may be larger than that shown in FIG. 6a, allowing centering bolt 125 to extend beyond nut 120 without dislodging cap 108. The relative locations of removable nut centering element 106 and washer 121 are also shown.

FIG. 6b shows a transverse cross-sectional view of nut restrainer 101 and other relevant elements after installation of fastening bolt 126. The location and direction of the cross sectional view through nut restrainer 101 shown in FIG. 6b is indicated by section B, as shown in at least FIG. 5a. As shown in FIG. 6b, fastened plate 124 is positioned such that the shank of fastening bolt 126 is in contact with the interior of substrate bolt hole 123, resulting in substrate bolt hole central axis 131 and fastening bolt central axis 132 being offset by a distance substantially equal to the radial tolerance of the bolt hole. Further, restrainer central axis 130 and fastening bolt central axis 132 are offset in substantially opposite directions from substrate bolt hole central axis 131, such that restrainer central axis 130 and fastening bolt central axis 132 are offset by a distance substantially equal to two times the radial tolerance of the bolt hole. To accommodate this worst-case misalignment, the nut space must provide freedom of movement to the nut equal to at least two times the radial tolerance of the bolt hole in all lateral directions. The relative locations of top plane 102, nut 120, washer 121, substrate plate 122, are also shown.

FIGS. 7, 8 and 9 show various views of an exemplary embodiment of the invention. FIGS. 7a and 7b show three-dimensional views of the embodiment in isolation. FIGS. 7c and 7d show elements of the embodiment in isolation to present aspects of the embodiment that are not easily visible when the embodiment is shown in its entirety. FIG. 7a shows a three-dimensional view of nut restrainer 101 from the top and side. The relative locations of top plane 102, viewports 107, and cap 108 are shown.

Figure 7A:
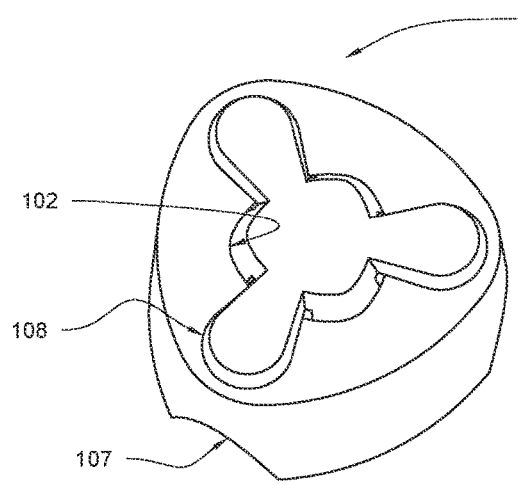
FIGS. 7a and 7b show three-dimensional views of the embodiment in isolation.
Figure 7B:
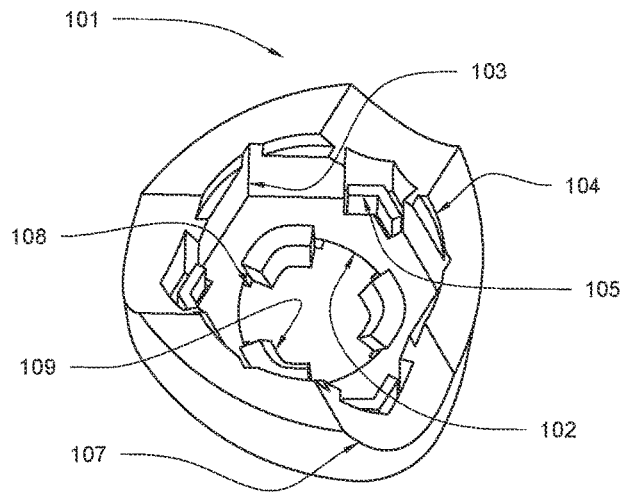

FIG. 7b shows a three-dimensional view of nut restrainer 101 from the bottom and side. FIG. 7b shows cap 108 with deformable nut centering elements 105 that extend into the cavity of nut restrainer 101 to hold nut 120 (shown in at least FIG. 9b) substantially concentric with nut restrainer 101 prior to insertion of fastening bolt 126 (shown in at least FIG. 9b). Deformable nut centering elements 105 are formed and proportioned to be flexible compared to the balance of nut restrainer 101, allowing nut 120 to move in a lateral direction to accept fastening bolt 126 if fastening bolt 126 is inserted into nut restrainer 101 non-concentrically with respect to nut restrainer 101. Unlike the embodiment shown in FIGS. 4 through 6, the embodiment shown in FIG. 7b does not require cap 108 to be removed prior to installation of fastening bolt 126. As shown in FIG. 7b, nut space sidewalls 103 include three recesses that allow deformable nut centering elements 105 to move in a lateral direction a distance of at least two times the radial tolerance of the bolt hole. The relative locations of top plane 102, washer space sidewalls 104, viewports 107, and snap-on protrusions 109 are also shown.

Figure 7C:
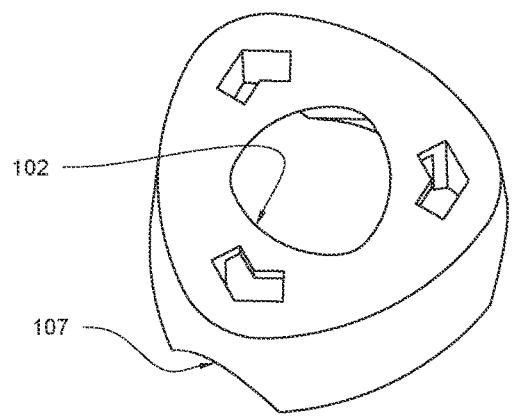
FIGS. 7c and 7d show elements of the embodiment in isolation to present aspects of the embodiment that are not easily visible when the embodiment is shown in its entirety.

FIG. 7c shows a three-dimensional view of nut restrainer 101 (shown in its entirety in at least FIG. 7a) from the top and side with cap 108 (shown in at least FIG. 7d) not present. As shown in FIG. 7c, top plane 102 has four openings. The three smaller openings provide locations where deformable nut centering elements 105 (shown in at least FIG. 7b) of cap 108 can be inserted into the cavity of nut restrainer 101. The larger opening in the center of top plane 102 serves at least two purposes. First, it allows the tip of fastening bolt 126 (shown in at least FIG. 9b) to pass through top plane 102 in cases where fastening bolt 126 extends past nut 120 (shown in at least FIG. 9b) in the final configuration. Second, the non-circular shape of the larger opening, which corresponds to the shape of snap-on protrusions 109 (shown in at least FIG. 7d), ensures that cap 108 may only be snapped into place in a position where deformable nut centering elements 105 pass through the three small openings in top plane 102, hold nut 120 substantially concentric with nut restrainer 101, and correspond to the recesses in nut space sidewalls 103. If the large opening in top plane 102 were circular, cap 108 could be snapped into place with an orientation whereby deformable nut centering elements 105 are not centered with respect to the three small openings in top plane 102, potentially resulting in deformable nut centering elements 105 being unable to move in a particular lateral direction due to obstruction by nut space sidewalls 103 (shown in at least FIG. 7b). The relative location of viewport 107 is also shown.

Figure 7D:
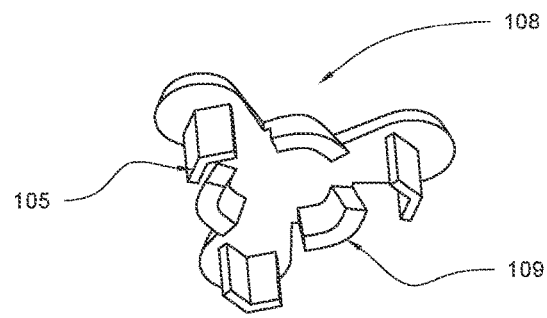

FIG. 7d shows a three-dimensional view of cap 108 in isolation from the bottom and side. As shown in FIG. 7d, cap 108 has at least four critical features: first, deformable nut centering elements 105 are dimensioned and arranged to engage with at least three sides of nut 120 (shown in at least FIG. 9b), holding nut 120 substantially concentric with nut restrainer 101 (shown in its entirety in at least FIG. 7a) prior to the insertion of fastening bolt 126 (shown in at least FIG. 9b). Second, snap-on protrusions 109 are configured such that cap 108 may be snapped into place atop nut restrainer 101, engaging with top plane 102 (shown in at least FIG. 7b). Third, top plane 102 and snap-on protrusions 109 are configured to ensure that cap 108 may only be snapped into place in a position from which deformable nut centering elements 105 hold nut 120 concentric with nut restrainer 101, and from which deformable nut centering elements 105 can deform as required to provide nut 120 freedom of movement substantially equal to at least two times the radial tolerance of the bolt hole. Fourth, deformable nut centering elements 105 are formed and proportioned to be flexible compared to the balance of nut restrainer 101, thus enabling nut 120 to move in a lateral direction to accept fastening bolt 126, if fastening bolt 126 is inserted into nut restrainer 101 non-concentrically with nut restrainer 101.

Figure 8A:
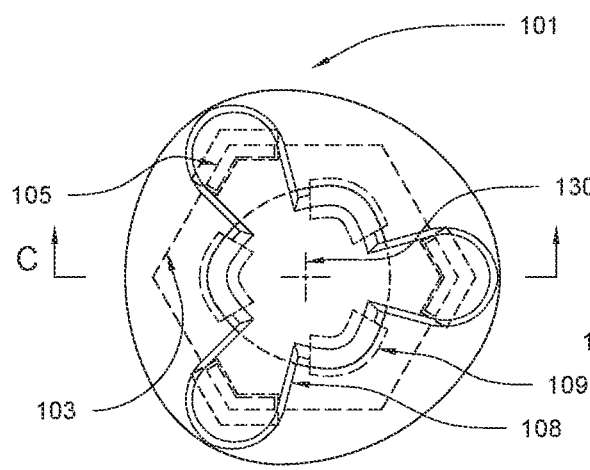
FIG. 8a shows a downward view of the embodiment in isolation.

FIG. 8 shows downward and cross sectional views of an embodiment of the invention, FIG. 8a shows a downward view of the embodiment in isolation. FIG. 8b shows a downward view of the embodiment with hardware included and the cap omitted. FIGS. 8c, 8d and 8e show cross sections of the embodiment with hardware included. FIG. 8a shows a downward view of nut restrainer 101 including cap 108. The relative locations of nut space sidewalls 103, deformable nut centering elements 105, snap-on protrusions 109, and restrainer central axis 130 are also shown. The location of section cut plane C is shown in FIG. 8a, and is used in subsequent figures to identify the orientation of particular cross-sectional views.

Figure 8B:
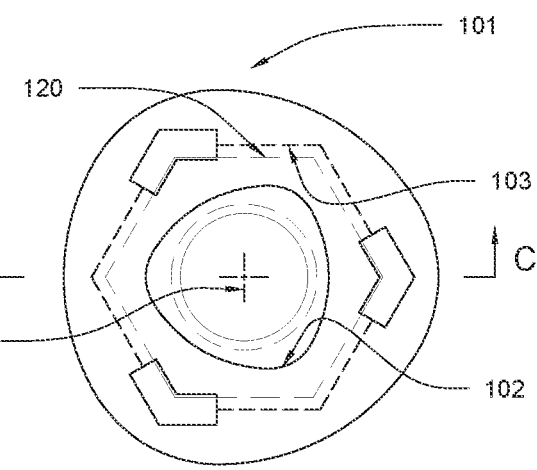
FIG. 8b shows a downward view of the embodiment with hardware included and the cap omitted.

FIG. 8b shows a downward view of nut restrainer 101 with cap 108 (shown in at least FIG. 8a) not present and nut 120 included. The relative locations of top plane 102, nut space sidewalls 103, and restrainer central axis 130 are also shown. The location of section cut plane C is shown in FIG. 8b, and is used in subsequent figures to identify the orientation of particular cross-sectional views.

Figure 8C:
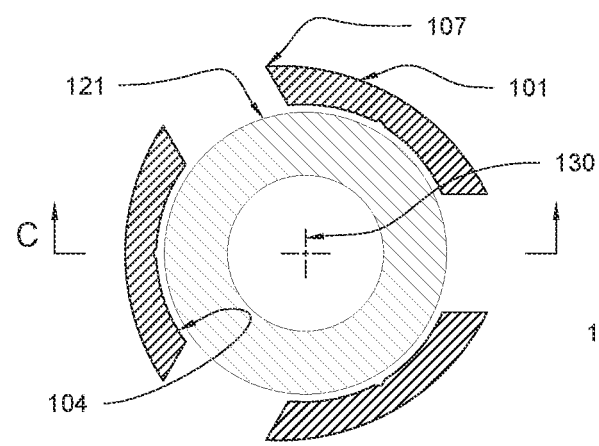
FIGS. 8c, 8d and 8e show cross sections of the embodiment with hardware included.

FIG. 8c shows a downward cross-sectional view of nut restrainer 101 with washer 121 included. The cross section shown in FIG. 8c is cut through washer space sidewalls 104 of nut restrainer 101. The relative locations of viewport 107, and restrainer central axis 130 are also shown. The location of section cut plane C is shown in FIG. 8c, and is used in subsequent figures to identify the orientation of particular cross-sectional views.

Figure 8D:
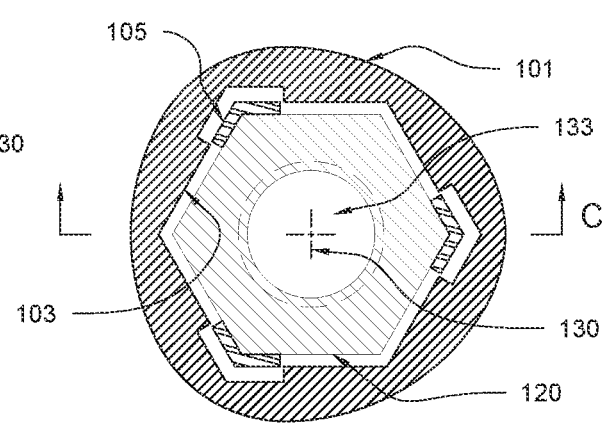

FIG. 8d shows a downward cross-sectional view of nut restrainer 101 with nut 120 inserted. The cross section shown in FIG. 8d is cut through nut space sidewalls 103 of nut restrainer 101. As shown in FIG. 8d, deformable nut centering elements 105 are sufficiently stiff and strong to hold nut 120 substantially concentric with nut restrainer 101 when no force acting on nut 120 in a lateral direction exceeds the magnitude of the force imposed on nut 120 by gravity. In cases where fastening bolt 126 (shown in at least FIG. 9b) is inserted into nut restrainer 101 non-concentrically with nut restrainer 101, interaction between the tip of fastening bolt 126 and nut 120 will cause nut 120 to displace laterally, pushing one or more deformable nut centering elements 105 into the recesses formed by nut space sidewalls 103 in this embodiment of the invention. The relative locations of restrainer central axis 130, and cavity 133 are also shown. The location of section cut plane C is shown in FIG. 8d, and is used in subsequent figures to identify the orientation of particular cross-sectional views.

Figure 8E:
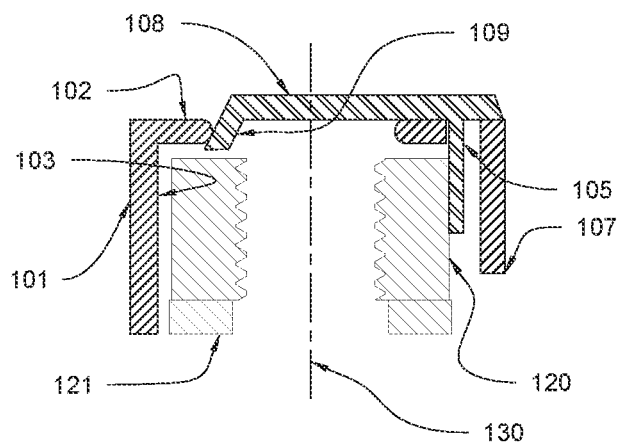

FIG. 8e shows a transverse cross-sectional view of nut restrainer 101 with nut 120 and washer 121 inserted. The location and direction of the cross sectional view through nut restrainer 101 as shown in FIG. 8e is indicated by section C, as shown in at least FIG. 8a. The relative locations of top plane 102, nut space sidewalls 103, deformable nut centering elements 105, viewport 107, cap 108, snap-on protrusions 109, and restrainer central axis 130 are also shown.

FIG. 9 shows cross-sectional views of an embodiment of the invention with hardware and other elements present, to show methods of alignment and use. FIG. 9a shows the embodiment at the moment of affixment to the substrate plate. FIG. 9b shows the embodiment during installation of the fastening bolt, FIG. 9c shows the embodiment after installation of the fastening bolt. FIG. 9a shows a transverse cross-sectional view of nut restrainer 101 and other relevant elements at the moment of affixment to substrate plate 122. The location and direction of the cross sectional view through nut restrainer 101 shown in FIG. 9a is indicated by section C, as shown in at least FIG. 8a. As shown in FIG. 9a, the shank of centering bolt 125 is in contact with the walls of substrate bolt hole 123, so that substrate bolt hole central axis 131 and restrainer central axis 130 are offset by a distance substantially equal to the radial tolerance of the bolt hole. As shown in FIG. 9a, in some embodiments, centering bolt 125 is shorter than fastening bolt 126 (shown in at least FIG. 9b) because centering bolt 125 extending beyond nut 120 during the process of locating and affixing nut restrainer 101 to substrate plate 122 could dislodge cap 108 before nut restrainer 101 is affixed to substrate plate 122. In other embodiments of the invention, the distance from substrate plate 122 to top plane 102 may be larger than that shown in FIG. 9a, allowing centering bolt 125 to extend beyond nut 120 without dislodging cap 108. The relative locations of deformable nut centering element 105, and washer 121 are also shown.

FIG. 9b shows a transverse cross-sectional view of nut restrainer 101 and other relevant elements during installation of fastening bolt 126. The location and direction of the cross sectional view through nut restrainer 101 shown in FIG. 9b is indicated by section C, as shown in at least FIG. 8a. As shown in FIG. 9b, fastened plate 124 is positioned such that the shank of fastening bolt 126 is in contact with the interior of substrate bolt hole 123, resulting in substrate bolt hole central axis 131 and fastening bolt central axis 132 being offset by a distance substantially equal to the radial tolerance of the bolt hole. Further, restrainer central axis 130 and fastening bolt central axis 132 are offset in substantially opposite directions from substrate bolt hole central axis 131, such that restrainer central axis 130 and fastening bolt central axis 132 are offset by a distance substantially equal to two times the radial tolerance of the bolt hole. To accommodate this worst-case misalignment, deformable nut centering elements 105 must be sufficiently flexible to deform when a force in a lateral direction acts on nut 120 due to interaction between nut 120 and the tip of fastening bolt 126, and the nut space must be shaped to provide nut 120 freedom of movement substantially equal to at least two times the radial tolerance of the bolt hole in all lateral directions, while not impeding the deformation of deformable nut centering elements 105. The deformation of deformable nut centering elements 105 due to movement of nut 120 in a lateral direction is visible in FIG. 9b as a change in shape and location of deformable nut centering element 105 relative to that shown in FIG. 9a. The relative locations of top plane 102, cap 108, washer 121, and substrate plate 122 are also shown.

FIG. 9c shows a transverse cross-sectional view of nut restrainer 101 and other relevant elements after installation of fastening bolt 126. The location and direction of the cross sectional view through nut restrainer 101 shown in FIG. 9c is indicated by section C, as shown in at least FIG. 8a, As shown in FIG. 9c, the tip of fastening bolt 126 has protruded past nut 120 and dislodged cap 108 from the balance of nut restrainer 101. The relative locations of top plane 102, washer 121, substrate plate 122, substrate bolt hole 123, fastened plate 124, restrainer central axis 130, substrate bolt hole central axis 131, and fastening bolt central axis 132 are also shown.

Figure 10A:
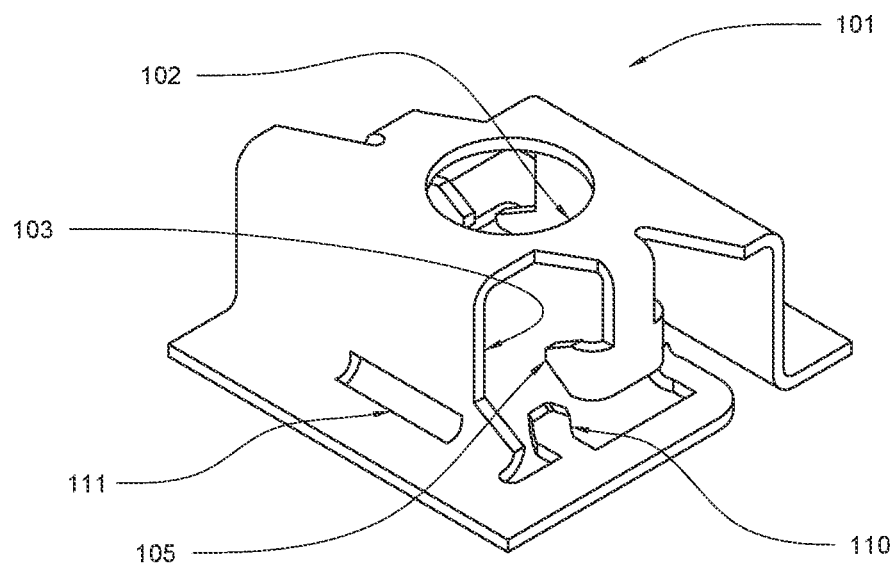
FIGS. 10a and 10b show three-dimensional views of the embodiment in isolation.
Figure 10B:
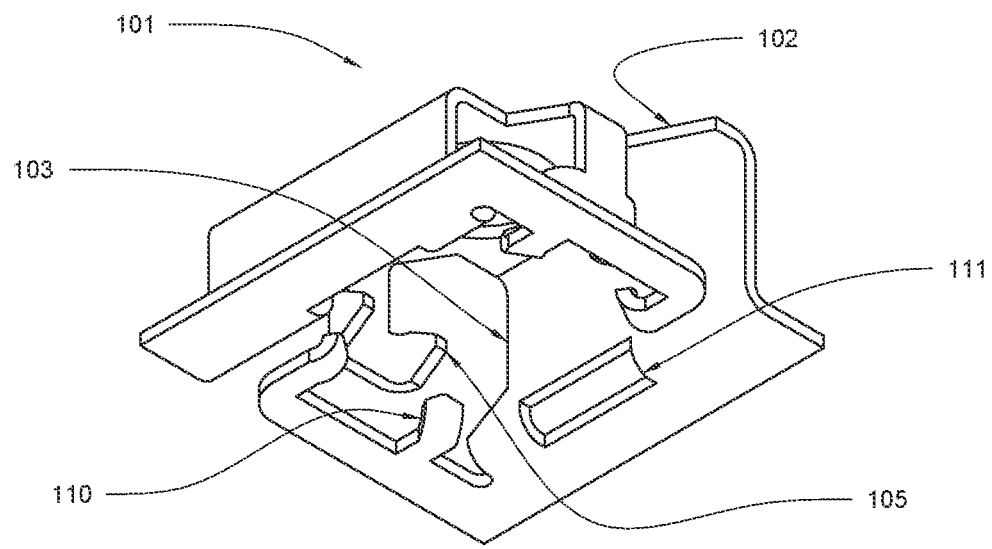
Figure 11A:
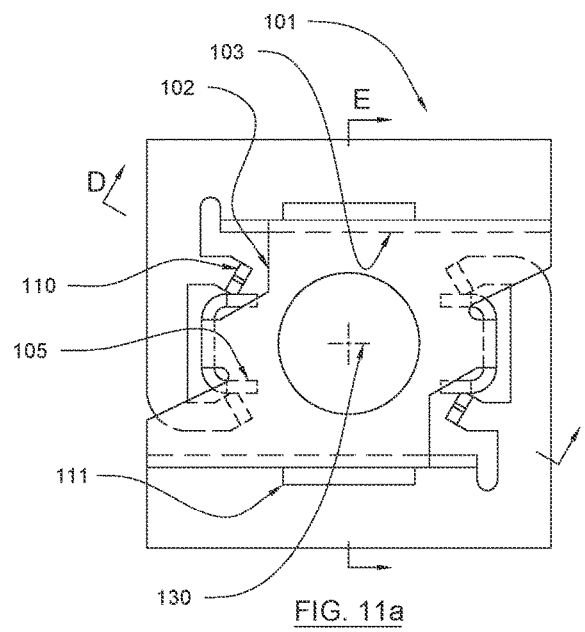
FIG. 11a shows a downward view of the embodiment in isolation.
Figure 11B:
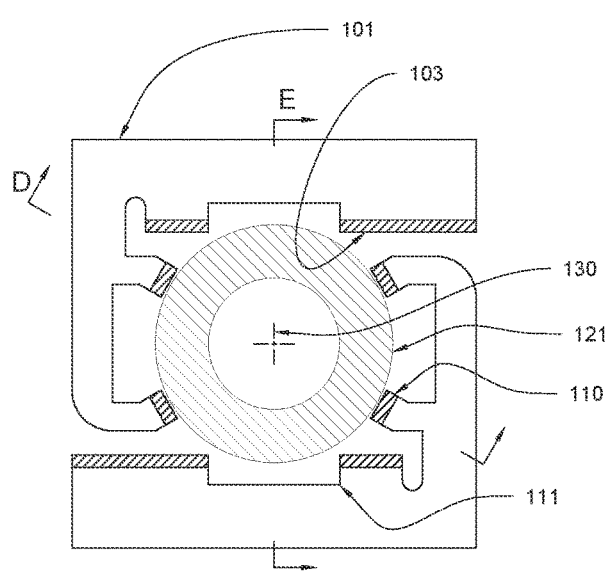
Figure 11C:
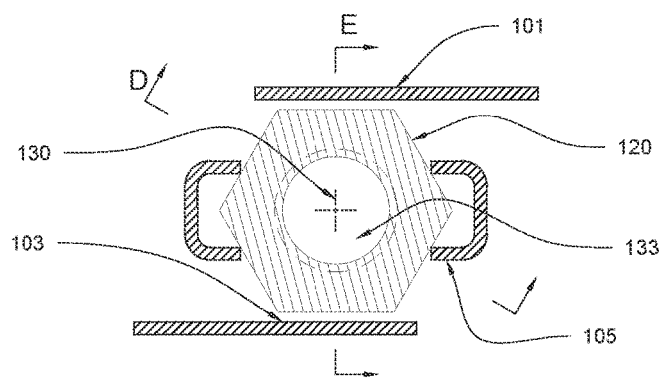
Figure 11D:
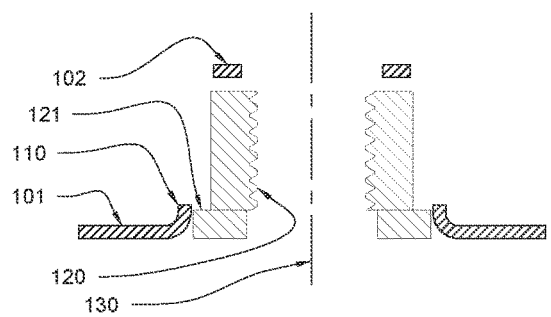
Figure 11E:
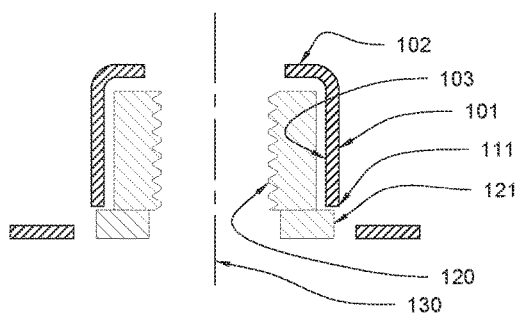
Figure 12A:
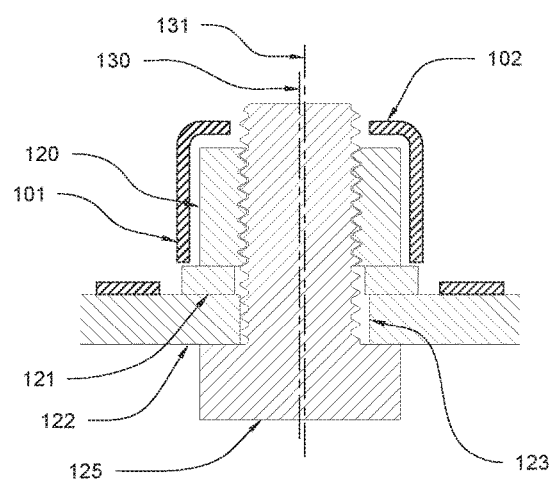
FIG. 12a shows the embodiment at the moment of affixment to the substrate plate.
Figure 12B:
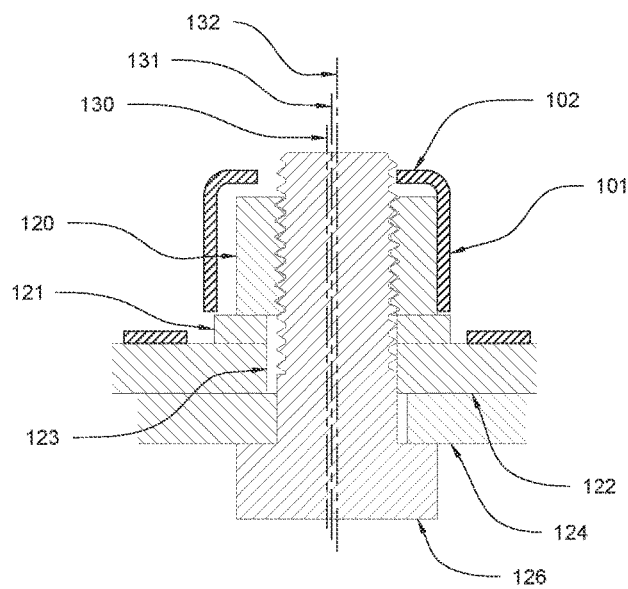
FIGS. 12b and 12c show the embodiment after installation of the fastening bolt.

FIGS. 10, 11 and 12 show various views of an exemplary embodiment of the invention. FIGS. 10a and 10b show three-dimensional views of the embodiment in isolation. FIG. 10a shows a three-dimensional view of nut restrainer 101 from the top and side. Nut restrainer 101 as shown in FIG. 10 is an embodiment well-suited to production by means of metal stamping, having a geometry that can be created by cutting and folding an initially flat piece of material. Deformable nut centering elements 105 comprise a pair of protrusions emanating from top plane 102 of nut restrainer 101. Each deformable nut centering element 105 ends in a U-shaped tip extending into the cavity of nut restrainer 101. When nut 120 (shown in at least FIG. 12b) is inserted into nut restrainer 101, the tips of the deformable nut centering elements 105 engage four of the six sides of nut 120, holding nut 120 substantially concentric with nut restrainer 101 prior to insertion of fastening bolt 126 (shown in at least FIG. 12b). If fastening bolt 126 is inserted into nut restrainer 101 non-concentrically with nut restrainer 101, deformable nut centering elements 105 will bend or twist, allowing nut 120 to move in a lateral direction to accept fastening bolt 126. The embodiment shown in FIG. 10a includes washer centering elements 110, which hold washer 121 (shown in at least FIG. 12b) substantially concentric with nut restrainer 101 prior to insertion of fastening bolt 126. Similar to deformable nut centering elements 105, washer centering elements 110 are flexible compared to the balance of nut restrainer 101, allowing washer 121 to move in a lateral direction to accept fastening bolt 126 if fastening bolt 126 is inserted into nut restrainer 101 non-concentrically with nut restrainer 101. Embodiments that include washer centering elements 110 are preferable to embodiments that allow washer 121 to move freely within the washer space because the maximum possible misalignment between the central axis of washer 121 and fastening bolt central axis 132 (shown in at least FIG. 12b) when fastening bolt 126 is inserted into nut restrainer 101 is reduced by the presence of washer centering elements 110. The embodiment shown in FIG. 10a includes washer cutout 111 to allow nut restrainer 101 to accept insertion of washer 121. The relative location of nut space sidewalls 103 is also shown.

FIG. 10b shows a three-dimensional view of nut restrainer 101 from the bottom and side. The relative locations of top plane 102, nut space sidewalls 103, deformable nut centering elements 105, washer centering elements 110, and washer cutout 111, are shown.

FIG. 11 shows downward and cross sectional views of an embodiment of the invention. FIG. 11a shows a downward view of the embodiment in isolation. FIGS. 11b, 11c, 11d and 11e show cross sections of the embodiment with hardware included. FIG. 11a shows a downward view of nut restrainer 101 in isolation. The relative locations of top plane 102, nut space sidewalls 103, deformable nut centering elements 105, washer centering elements 110, washer cutout 111, and restrainer central axis 130 are shown. The location of section cuts planes D and E are shown in FIG. 11a, and are used in subsequent figures to identify the orientation of particular cross-sectional views.

FIG. 11b shows a downward cross-sectional view of nut restrainer 101 with washer 121 included. The cross section shown in FIG. 11b is cut through washer centering elements 110 of nut restrainer 101. The relative locations of nut space sidewalls 103, washer cutout 111 and restrainer central axis 130 are also shown. The location of section cuts planes D and E are shown in FIG. 11b, and are used in subsequent figures to identify the orientation of particular cross-sectional views.

FIG. 11c shows a downward cross-sectional view of nut restrainer 101 with nut 120 inserted. The cross section shown in FIG. 11c is cut through nut space sidewalls 103 and deformable nut centering elements 105 of nut restrainer 101. As shown in FIG. 11c, deformable nut centering elements 105 are configured to hold nut 120 substantially concentric with nut restrainer 101 when no force acting on nut 120 in a lateral direction exceeds the magnitude of the force imposed on nut 120 by gravity. In cases where fastening bolt 126 (shown in at least FIG. 12b) is inserted into nut restrainer 101 non-concentrically with nut restrainer 101, interaction between the tip of fastening bolt 126 and nut 120 will cause nut 120 to displace laterally, bending or twisting one or more deformable nut centering elements 105, and allowing fastening bolt 126 to be tightened with nut 120. Deformable nut centering elements 105 are preferably configured so that deformable nut centering elements 105 must move away from the restrainer central axis 130 to accommodate insertion of nut 120. Requiring deformable nut centering elements 105 to move outwards to accommodate nut 120 ensures that nut 120 is held in snug contact with deformable nut centering elements 105, and substantially concentric with nut restrainer 101, even in cases where manufacturing inaccuracies result in nut 120 being smaller than its theoretical dimensions. The relative location of cavity 133 is also shown. The location of section cut planes D and E are shown in FIG. 11c, and are used in subsequent figures to identify the orientation of particular cross-sectional views.

FIG. 11d shows a transverse cross-sectional view of nut restrainer 101 with nut 120 and washer 121 inserted. The location and direction of the cross sectional view through nut restrainer 101 as shown in FIG. 11d is indicated by section D, as shown in at least FIG. 11a. The relative locations of top plane 102, washer centering elements 110, and restrainer central axis 130 are also shown.

FIG. 11e shows a transverse cross-sectional view of nut restrainer 101 with nut 120 and washer 121 inserted. The location and direction of the cross sectional view through nut restrainer 101 as shown in FIG. 11e is indicated by section E, as shown in at least FIG. 11a. The relative locations of top plane 102, nut space sidewalls 103, washer cutout 111, and restrainer central axis 130 are also shown.

Figure 12C:
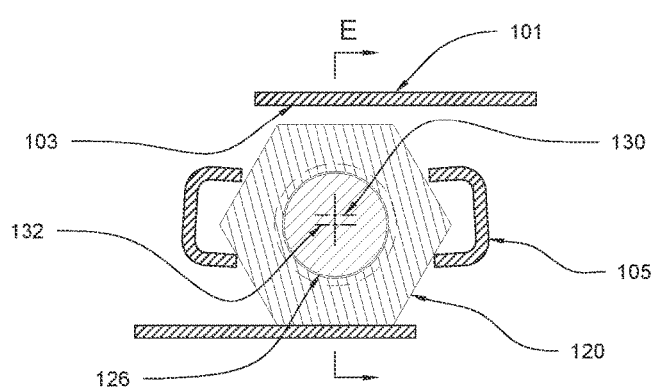

FIG. 12 shows cross-sectional views of an embodiment of the invention with hardware and other elements present, to show methods of alignment and use. FIG. 12a shows the embodiment at the moment of affixment to the substrate plate. FIGS. 12b and 12c show the embodiment after installation of the fastening bolt. FIG. 12a shows a transverse cross-sectional view of nut restrainer 101 and other relevant elements at the moment of affixment to substrate plate 122. The location and direction of the cross sectional view through nut restrainer 101 shown in FIG. 12a is indicated by section E, as shown in at least FIG. 11a, As shown in FIG. 12a, the shank of centering bolt 125 is in contact with the walls of substrate bolt hole 123, so that substrate bolt hole central axis 131 and restrainer central axis 130 are offset by a distance substantially equal to the radial tolerance of the bolt hole. In some embodiments, centering bolt 125 and fastening bolt 126 (shown in at least FIG. 12b) may be the same bolt. However, in other cases, the lengths of threaded and unthreaded portions (if present) of the shank of fastening bolt 126 may prevent fastening bolt 126 from being brought into snug contact with nut 120 in the absence of fastened plate 124 (shown in at least FIG. 12b), necessitating the use of a distinct bolt as centering bolt 125. The relative locations of top plane 102 and washer 121 are also shown.

FIG. 12b shows a transverse cross-sectional view of nut restrainer 101 and other relevant elements after installation of fastening bolt 126. The location and direction of the cross sectional view through nut restrainer 101 shown in FIG. 12b is indicated by section E, as shown in at least FIG. 11a. As shown in FIG. 12b, fastened plate 124 is positioned such that the shank of fastening bolt 126 is in contact with the interior of substrate bolt hole 123, resulting in substrate bolt hole central axis 131 and fastening bolt central axis 132 being offset by a distance substantially equal to the radial tolerance of the bolt hole. Further, restrainer central axis 130 and fastening bolt central axis 132 are offset in substantially opposite directions from substrate bolt hole central axis 131, such that restrainer central axis 130 and fastening bolt central axis 132 are offset by a distance substantially equal to two times the radial tolerance of the bolt hole. To accommodate this worst-case misalignment, deformable nut centering elements 105 (shown in at least FIG. 12c) must be sufficiently flexible to deform when a force in a lateral direction acts on nut 120 due to interaction between nut 120 and the tip of fastening bolt 126, and the nut space must be shaped to provide nut 120 freedom of movement substantially equal to at least two times the radial tolerance of the bolt hole in all lateral directions. The relative locations of top plane 102, washer 121, and substrate plate 122 are also shown.

FIG. 12c shows a downward cross-sectional view of nut restrainer 101 and other relevant elements after installation of fastening bolt 126. As shown in FIG. 12c, nut 120 has moved in a lateral direction to accept insertion of fastening bolt 126, causing deformable nut centering elements 105 to bend and twist. The relative locations of nut space sidewalls 103, restrainer central axis 130, fastening bolt central axis 132 are also shown.

Figure 13A:
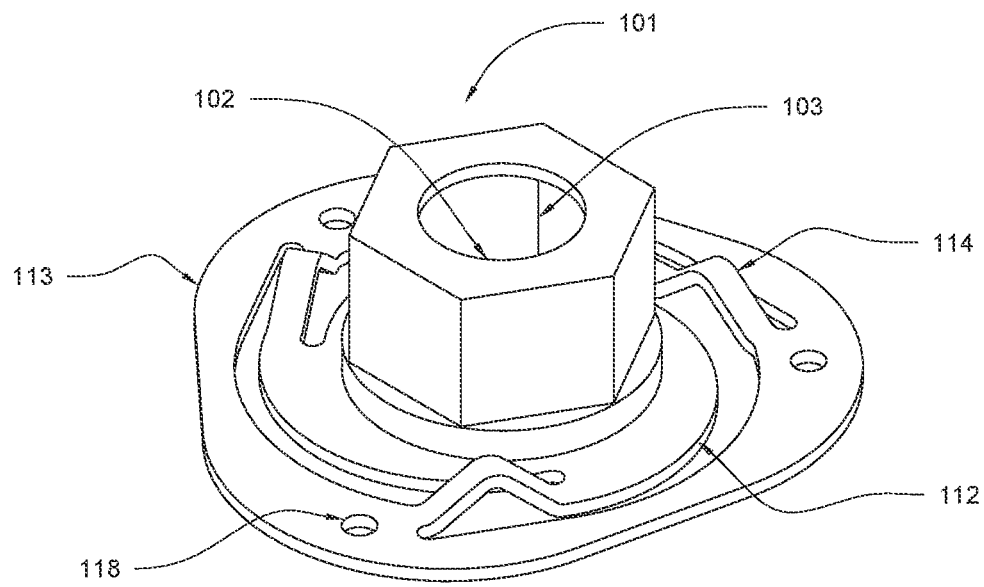
FIGS. 13a and 13b each show a three-dimensional view of an embodiment of the invention in isolation.
Figure 13B:
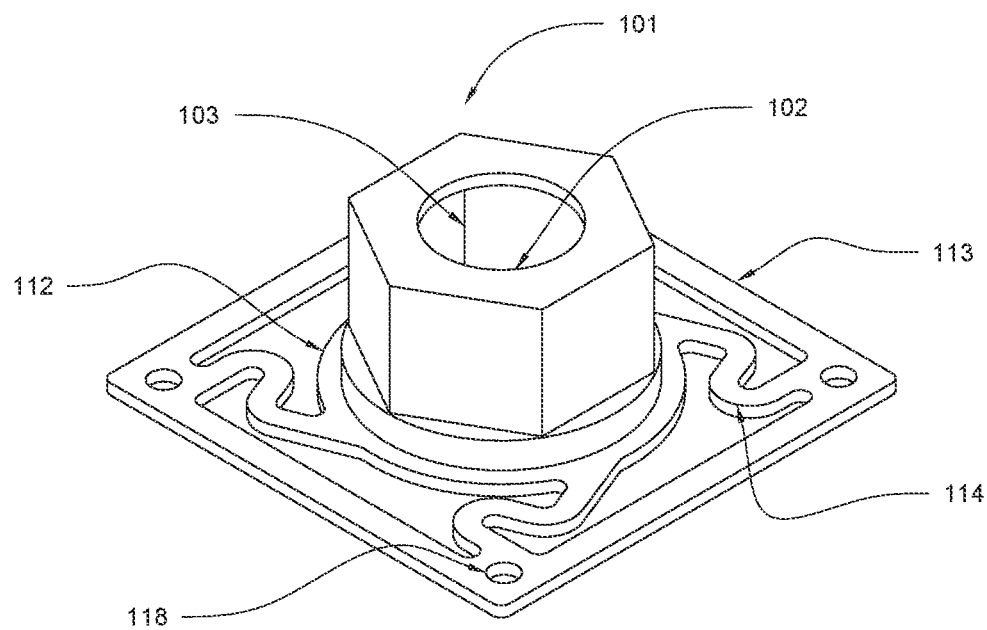
Figure 14A:
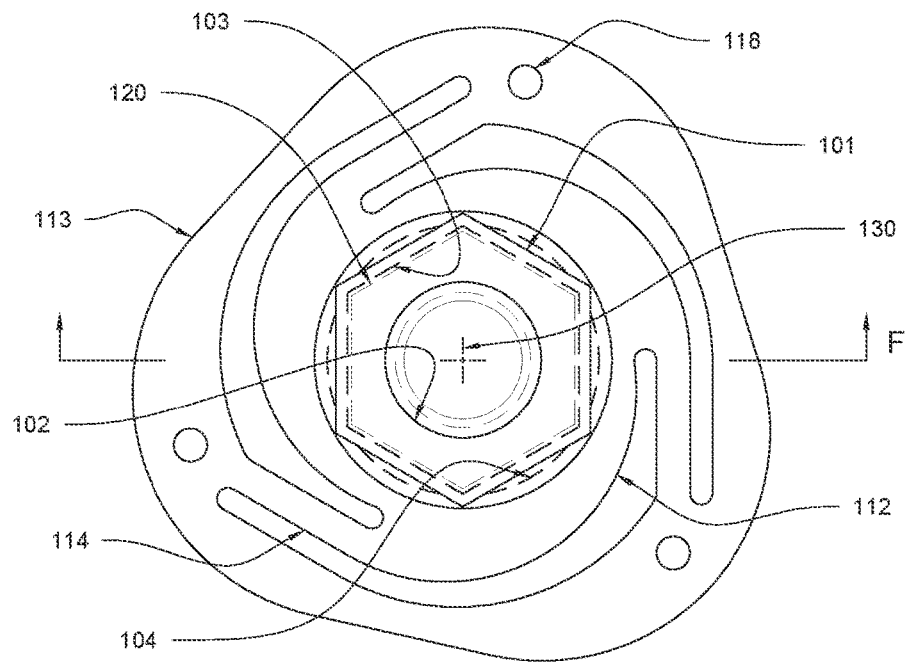
FIG. 14a shows a downward view of the embodiment with hardware included.
Figures 14B, 14C:
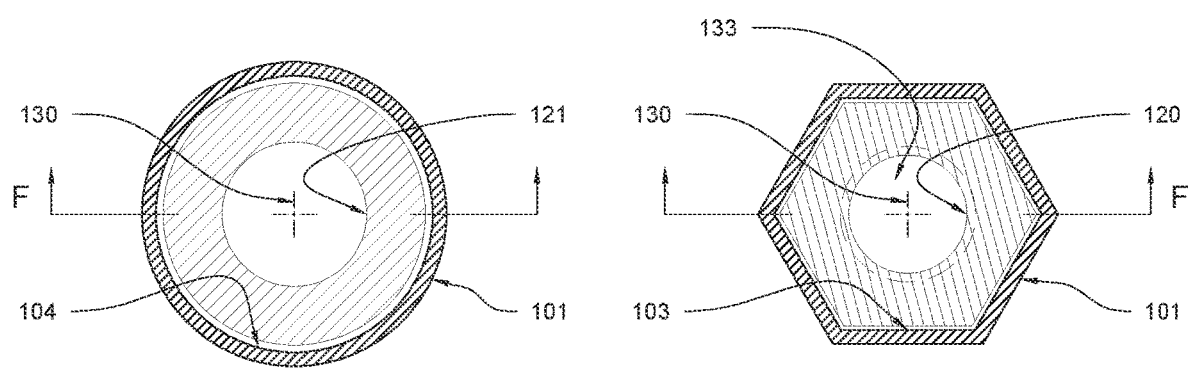
FIGS. 14b, 14c, and 14d show cross sections of the embodiment with hardware included.
Figure 14D:
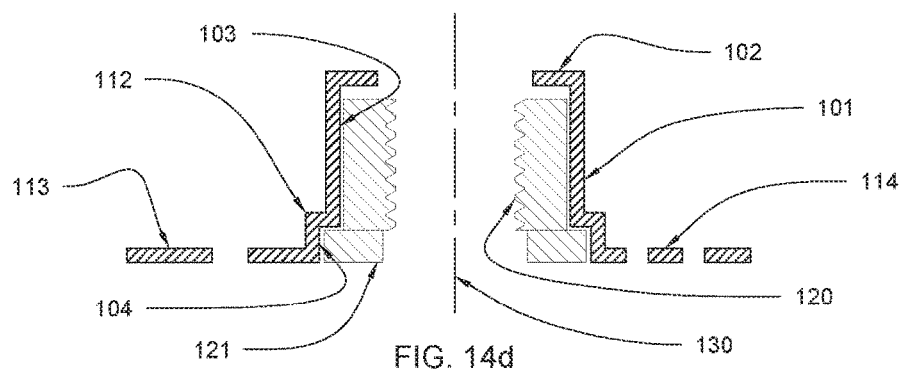
Figure 15A:
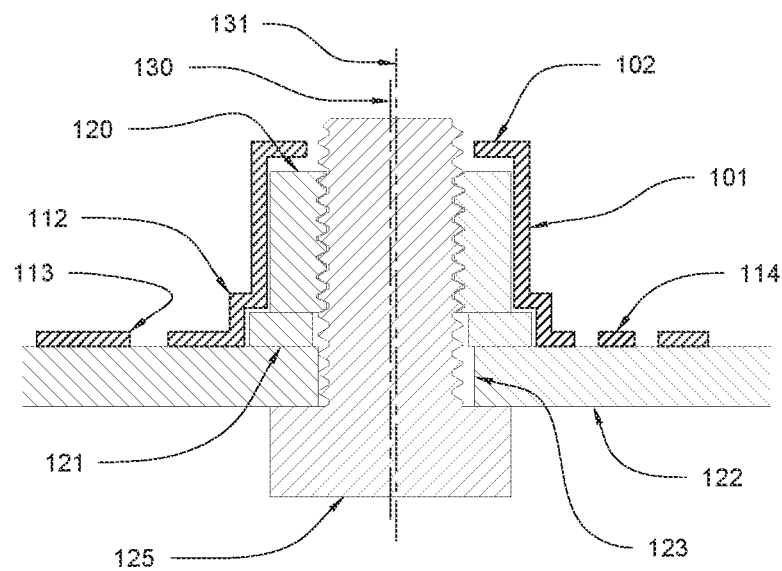
FIG. 15a shows the embodiment at the moment of affixment to the substrate plate.
Figure 15B:
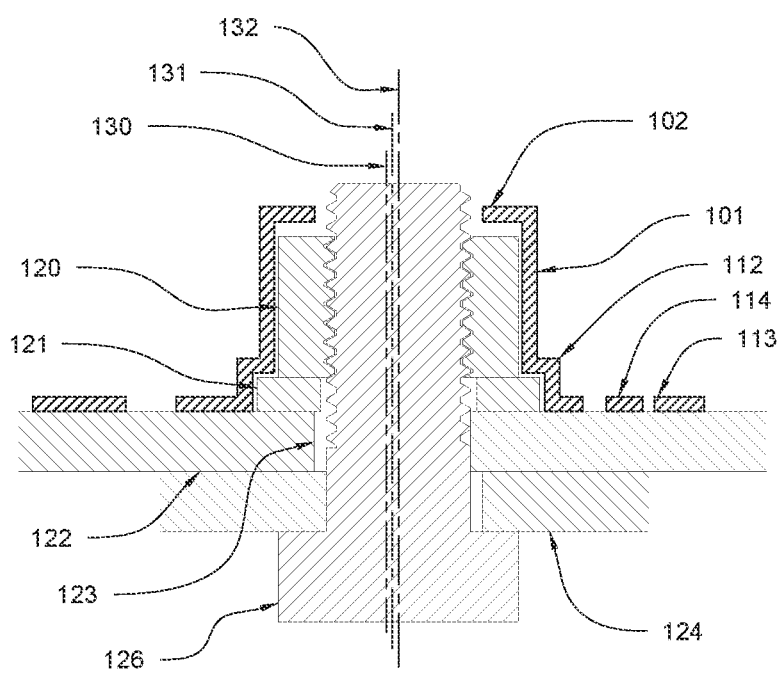
FIG. 15b shows the embodiment after installation of the fastening bolt.

FIGS. 13, 14 and 15 show various views of exemplary embodiments of the invention, FIGS. 13a and 13b each show a three-dimensional view of an embodiment of the invention in isolation. FIGS. 14 and 15 show other views of the embodiment shown in FIG. 13a. Whereas the embodiments of the invention shown in FIGS. 1 through 12 allow the nut to move within the cavity of the nut restrainer to accept the fastening bolt when the fastening bolt is inserted non-concentrically with the nut restrainer, the embodiments shown in FIGS. 13 through 15 (as well as FIGS. 16 through 19) allow the cavity, and the nut inserted therein, to move so that the nut can accept the fastening bolt if the fastening bolt is inserted into the nut restrainer non-concentrically with the nut restrainer. As shown in FIG. 13a, nut restrainer 101 includes mobile central portion 112 that is joined to rigid outer portion 113 by means of flexible connectors 114. Flexible connectors 114 are slender and bent away from substrate plate 122 (shown in at least FIG. 15b), making them flexible in all lateral directions compared to the balance of nut restrainer 101. If fastening bolt 126 is inserted into nut restrainer 101 non-concentrically with nut restrainer 101, flexible connectors 114 will bend or twist, thus allowing mobile central portion 112, nut 120 (shown in at least FIG. 15b) and washer 121 (shown in at least FIG. 15b) restrained within mobile central portion 112, to move laterally with respect to rigid outer portion 113, and accept fastening bolt 126. Rigid outer portion 113 is formed so that no portion of rigid outer portion 113 impedes movement of mobile central portion 112 in any lateral direction within two times the tolerance of the bolt hole from the equilibrium position of mobile central portion 112. Embodiments that include mobile central portion 112 (including those shown in FIGS. 13 through 19) may have the advantage of more tightly confining nut 120 within the nut space, and thus more effectively rotationally restraining nut 120, even when nut 120 is subjected to high magnitudes of torque during the installation of fastening bolt 126, than embodiments (including those shown in FIGS. 1 through 12) that allow nut 120 to move within the cavity of nut restrainer 101. The relative locations of top plane 102, nut space sidewalls 103, and weld location indicator 118 are also shown.

FIG. 13b shows an embodiment of nut restrainer 101 similar to that shown in FIG. 13a, except that the comparative flexibility of flexible connectors 114 is attributable to a tortuous path, rather than being bent away from substrate plate 122 (shown in at least FIG. 15b). The embodiment shown in FIG. 13b may be cheaper to produce that that shown in FIG. 13a because flexible connectors 114 are coplanar with rigid outer portion 113. In both the embodiments shown in FIGS. 13a and 13b, mobile central portion 112, rigid outer portion 113, and flexible connectors 114 are formed such that flexible connectors 114 will elongate, and become increasingly stiff with respect to rotation about restrainer central axis 130 (shown in at least FIG. 15b) as torque is applied to the nut in the direction associated with the tightening of fastening bolt 126 (shown in at least FIG. 15b) with nut 120 (shown in at least FIG. 15b). Flexible connectors 114 are proportioned to be sufficiently strong to resist the maximum torque that is anticipated to be transferred to mobile central portion 112 during the process of tightening fastening bolt 126 with nut 120. The relative locations of top plane 102, nut space sidewalls 103, and weld location indicator 118 are also shown.

FIG. 14 shows downward and cross sectional views of an embodiment of the invention. FIG. 14a shows a downward view of the embodiment with hardware included. FIGS. 14b, 14c, and 14d show cross sections of the embodiment with hardware included. FIG. 14a shows a downward view of nut restrainer 101 with nut 120 included. As shown in FIG. 14a, rigid outer portion 113 includes weld location indicators 118, which show the user a suggested location for affixing (by way of non-limiting example, in this embodiment by welding) rigid outer portion 113 to substrate plate 122 (shown in at least FIG. 15b). When torque is applied to mobile central portion 112 by tightening fastening bolt 126 (shown in at least FIG. 15b) with nut 120, flexible connectors 114 will transmit force in tension between mobile central portion 112 and outer rigid outer portion 113. Weld location indicators 118 are located along the centerline of flexible connectors 114 so that force is transmitted from flexible connectors 114 to the points of affixment to substrate plate 122 without inducing bending in rigid outer portion 113, thereby reducing the amount of material required to make rigid outer portion 113 sufficiently rigid. The relative locations of top plane 102, nut space sidewalls 103, washer space sidewalls 104, and restrainer central axis 130 are shown. The location of section cut plane F is shown in FIG. 14a, and is used in subsequent figures to identify the orientation of particular cross-sectional views.

FIG. 14b shows a downward cross-sectional view of nut restrainer 101 with washer 121 included. The cross section shown in FIG. 14b is cut through washer space sidewalls 104 of nut restrainer 101. Minimizing, to the greatest extent practical, the possible movement of washer 121 in any lateral direction within the washer space prior to insertion of fastening bolt 126 (shown in at least FIG. 15b) may enhance the performance of nut restrainer 101 because it reduces the maximum possible misalignment between the central axis of washer 121 and fastening bolt central axis 132 (shown in at least FIG. 15b) when fastening bolt 126 is inserted into nut restrainer 101. One way to reduce the possible movement of washer 121 within the washer space is to reduce the diameter of the washer space for a given size of washer 121. The washer spaces in embodiments (such as those shown in FIGS. 13 through 19) that include mobile central portion 112 (shown in at least FIG. 13a) may have smaller diameters for a given size washer 121 than in the embodiments (such as those shown in FIGS. 1 through 12) without mobile central portion 112, because embodiments including mobile central portion 112 do not require washer 121 to be able to move within the washer space to accept fastening bolt 126 (shown in at least FIG. 15b) if fastening bolt 126 is inserted into nut restrainer 101 non-concentrically with nut restrainer 101. A second way, to reduce the possible movement of the washer in any lateral direction prior to insertion of the fastening bolt is to include washer centering elements, as in the embodiment shown in FIGS. 10 through 12, The relative location of restrainer central axis 130 is also shown. The location of section cut plane F is shown in FIG. 14b, and is used in subsequent Figures to identify the orientation of particular cross-sectional views.

FIG. 14c shows a downward cross-sectional view of nut restrainer 101 with nut 120 included. The cross section shown in FIG. 14c is cut through nut space sidewalls 103 of nut restrainer 101. Minimizing, to the greatest extent practical, the interior dimensions of the nut space may enhance the performance of nut restrainer 101 because the more tightly confined nut 120 is within the nut space, the less likely nut 120 is to mar or otherwise damage nut space sidewalls 103 when subjected to torque due to the tightening of fastening bolt 126 (shown in at least FIG. 15b) with nut 120. The nut space in embodiments (such as those shown in FIGS. 13 through 19) that include mobile central portion 112 (shown in at least FIG. 13a) may have a smaller interior dimensions for a given size nut 120 than in embodiments (such as those shown in FIGS. 1 through 12) without mobile central portion 112, because embodiments that include mobile central portion 112 do not require nut 120 to be able to move within the nut space to accept fastening bolt 126 if fastening bolt 126 is inserted into nut restrainer 101 non-concentrically with nut restrainer 101. The relative locations of restrainer central axis 130 and cavity 133 are also shown. The location of section cut plane F is shown in FIG. 14c, and is used in subsequent figures to identify the orientation of particular cross-sectional views.

FIG. 14d shows a transverse cross-sectional view of nut restrainer 101 with nut 120 and washer 121 inserted. The location and direction of the cross sectional view through nut restrainer 101 as shown in FIG. 14d is indicated by section F, as shown in at least FIG. 14a. The relative locations of top plane 102, nut space sidewalls 103, washer space sidewalls 104, mobile central portion 112, rigid outer portion 113, flexible connectors 114, and restrainer central axis 130 are also shown.

FIG. 15 shows cross-sectional views of an embodiment of the invention with hardware and other elements present, to show methods of alignment and use. FIG. 15a shows the embodiment at the moment of affixment to the substrate plate. FIG. 15b shows the embodiment after installation of the fastening bolt. FIG. 15a shows a transverse cross-sectional view of nut restrainer 101 and other relevant elements at the moment of affixment to substrate plate 122. The location and direction of the cross sectional view through nut restrainer 101 shown in FIG. 15a is indicated by section F, as shown in at least FIG. 14a, As shown in FIG. 15a, the shank of centering bolt 125 is in contact with the walls of substrate bolt hole 123, so that substrate bolt hole central axis 131 and restrainer central axis 130 are offset by a distance substantially equal to the radial tolerance of the bolt hole. In some embodiments, centering bolt 125 and fastening bolt 126 (shown in at least FIG. 15b) may be the same bolt. However, in other cases, the lengths of threaded and unthreaded portions (if present) of the shank of fastening bolt 126 may prevent fastening bolt 126 from being brought into snug contact with nut 120 in the absence of fastened plate 124 (shown in at least FIG. 15b), necessitating the use of a distinct bolt as centering bolt 125. The relative locations of top plane 102, mobile central portion 112, rigid outer portion 113, flexible connectors 114, and washer 121 are also shown.

FIG. 15b shows a transverse cross-sectional view of nut restrainer 101 and other relevant elements after installation of fastening bolt 126. The location and direction of the cross sectional view through nut restrainer 101 shown in FIG. 15b is indicated by section F, as shown in at least FIG. 14a. As shown in FIG. 15b, fastened plate 124 is positioned such that the shank of fastening bolt 126 is in contact with the interior of substrate bolt hole 123, resulting in substrate bolt hole central axis 131 and fastening bolt central axis 132 being offset by a distance substantially equal to the radial tolerance of the bolt hole. Further, restrainer central axis 130 and fastening bolt central axis 132 are offset in substantially opposite directions from substrate bolt hole central axis 131, such that restrainer central axis 130 and fastening bolt central axis 132 are offset by a distance substantially equal to two times the radial tolerance of the bolt hole. To accommodate this worst-case misalignment, flexible connectors 114 must be sufficiently flexible to deform when a lateral force is imposed on nut 120 due to interaction between nut 120 and the tip of fastening bolt 126. Deformation of flexible connectors 114 due to lateral movement of nut 120 is visible in FIG. 15b as a change in the size of the gap separating mobile central portion 112 from rigid outer portion 11 compared to the gap shown in FIG. 15a. The relative locations of top plane 102, washer 121, substrate plate 122, are also shown.

Figure 16A:
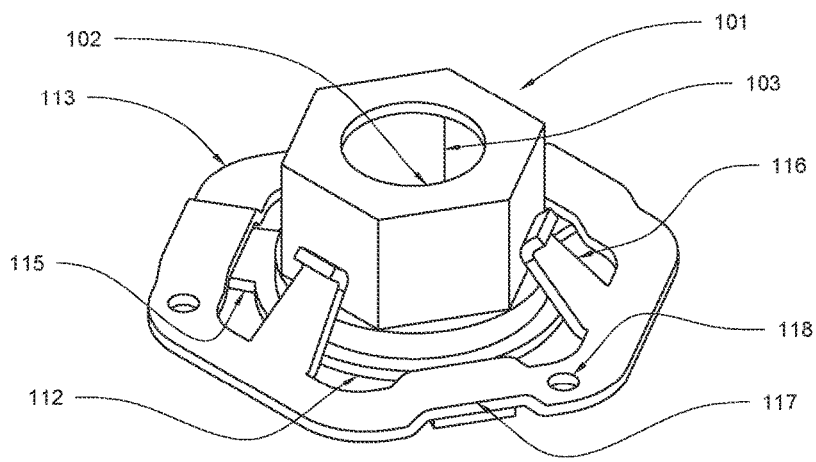
FIGS. 16a and 16b show three-dimensional views of the embodiment in isolation.
Figure 16B:
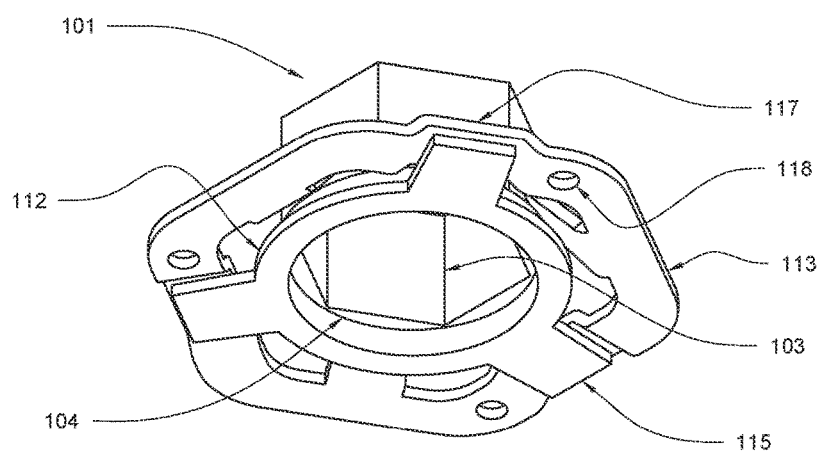
Figures 16C, 16D:
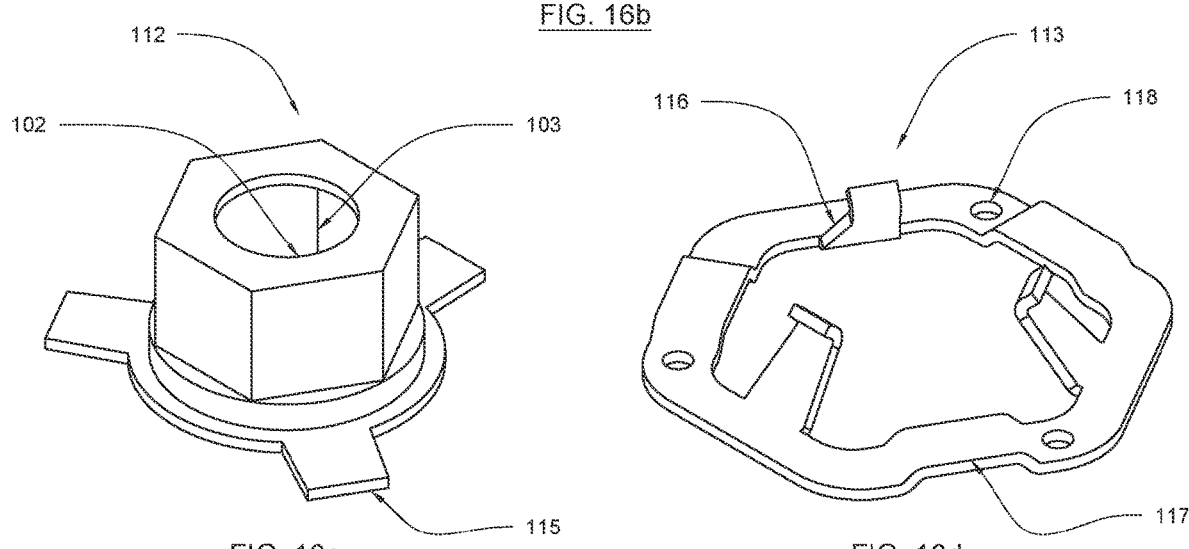
FIGS. 16c and 16d show elements of the embodiment in isolation to present aspects of the embodiment that are not easily visible when the embodiment is shown in its entirety.
Figure 17A:
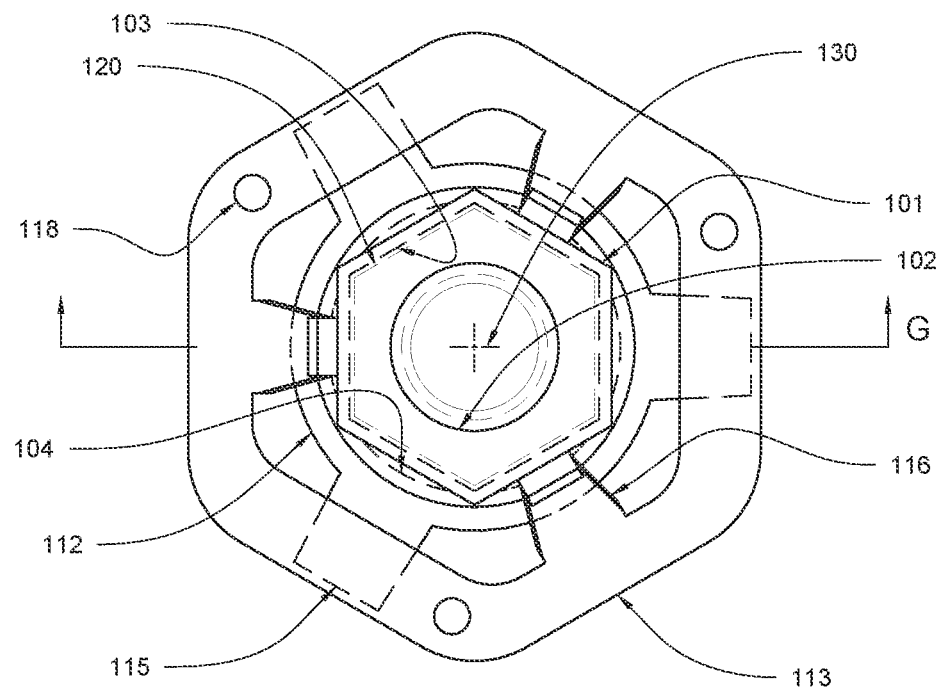
FIG. 17a shows a downward view of the embodiment with hardware included.
Figure 17B:
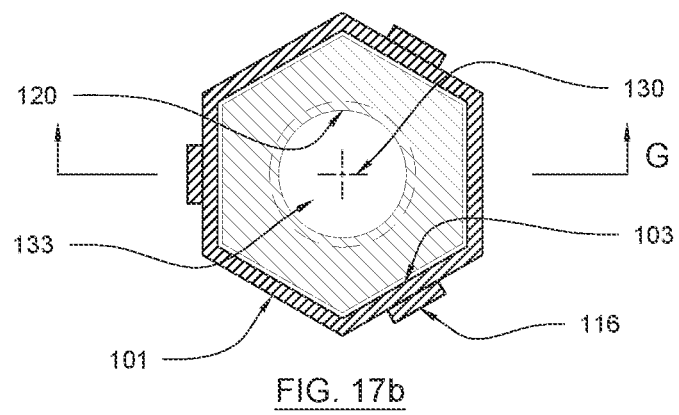
FIGS. 17b and 17c show cross sections of the embodiment with hardware included.
Figure 17C:
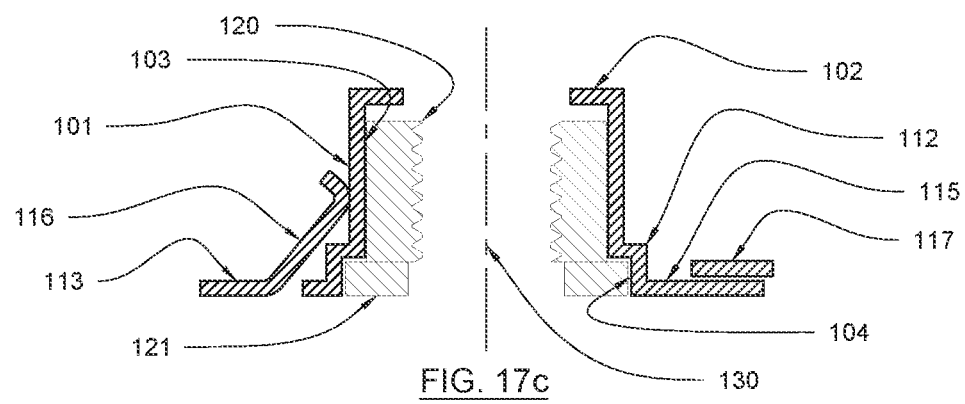
Figure 18A:
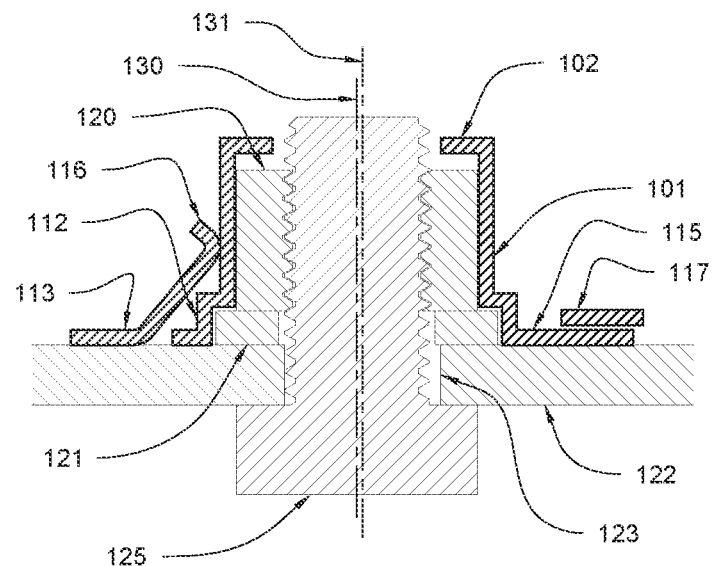
FIG. 18a shows the embodiment at the moment of affixment to the substrate plate.
Figure 18B:
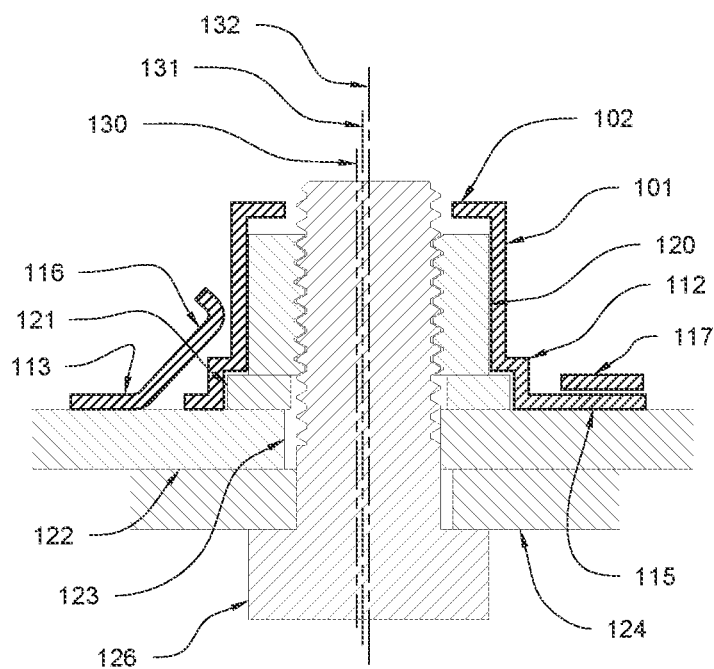
FIG. 18b shows the embodiment after installation of the fastening bolt.

FIGS. 16, 17 and 18 show various views of an exemplary embodiment of the invention, FIGS. 16a and 16b show three-dimensional views of the embodiment in isolation. FIGS. 16c and 16d show elements of the embodiment in isolation to present aspects of the embodiment that are not easily visible when the embodiment is shown in its entirety. FIG. 16a shows a three-dimensional view of nut restrainer 101 from the top and side in isolation. Whereas the embodiments of the nut restrainer presented in FIGS. 13 through 15, include a mobile central portion contiguous with a rigid outer portion, and joined by flexible connectors, the embodiment shown in FIGS. 16 through 18 comprises mobile central portion 112 and rigid outer portion 113 that are distinct portions of material, with mobile central portion 112 held in place by rigid outer portion 113, Mobile central portion 112 accepts insertion of nut 120 (shown in at least FIG. 18b) and washer 121 (shown in at least FIG. 18b), and rotationally restrains nut 120 within the nut space, Rigid outer portion 113 includes deformable protrusions 116, which are configured so that the tips of deformable protrusions 116 are in snug contact with mobile central portion 112. As shown in FIG. 16a, deformable protrusions 116 engage three of the six flat exterior sides of mobile central portion 112 (though other embodiments where the mobile central portion does not have flat exterior sides are also envisioned), holding mobile central portion 112 substantially concentric with rigid outer portion 113 when no force in any lateral direction acting on nut 120, washer 121 or mobile central portion 112 has a magnitude exceeding the magnitude of the force acting on the respective elements due to gravity. Deformable protrusions 116 are formed and proportioned to be sufficiently flexible to deform when a lateral force is imposed on nut 120 due to an interaction between nut 120 and the tip of fastening bolt 126 (shown in at least FIG. 18b), allowing nut 120, washer 121, and mobile central portion 112 to move laterally to accept fastening bolt 126 if fastening bolt 126 is inserted into nut restrainer 101 non-concentrically with nut restrainer 101. Rigid outer portion 113 is configured so that no portion of rigid outer portion 113 impedes the lateral movement of mobile central portion 112 within two times the radial tolerance of the bolt hole in any direction from the equilibrium position of mobile central portion 112. The relative locations of top plane 102, nut space sidewalls 103, radial protrusions 115, raised hold-downs 117, and weld location indicators 118 are also shown.

FIG. 16b shows a three-dimensional view of nut restrainer 101 from the bottom and side in isolation. Mobile central portion 112 includes radial protrusions 115. Rigid outer portion 113 includes raised hold-downs 117 that are not in contact with substrate plate 122 (shown in at least FIG. 18b) after affixment of nut restrainer 101 to substrate plate 122. The spaces between raised hold-downs 117 and substrate plate 122 constitute recesses into which radial protrusions 115 of mobile central portion 112 fit. Confinement of radial protrusions 115 between raised hold-downs 117 and substrate plate 122 rotationally restrains mobile central portion 112, and prevents mobile central portion 112 from moving away from substrate plate 122 if nut 120 (shown in at least FIG. 18b) is acted on by a force perpendicular to the face of substrate plate 122 due to the insertion of fastening bolt 126 (shown in at least FIG. 18b) through substrate bolt hole 123 (shown in at least FIG. 18b). The relative locations of nut space sidewalls 103, washer space sidewalls 104, and weld location indicator 118 are also shown.

FIG. 16c shows a three-dimensional view of mobile central portion 112 from the top and side in isolation. The relative locations of top plane 102, nut space sidewall 103, and radial protrusions 115 are shown, FIG. 16d shows a three-dimensional view of rigid outer portion 113 from the top and side in isolation. Rigid outer portion 113 includes weld location indicators 118, indicating the ideal location for affixing (by way of non-limiting example, in this embodiment by welding) rigid outer portion 113 to substrate plate 122 (shown in at least FIG. 18b). When torque acts on mobile central portion 112 (shown in at least FIG. 16a) due to the action of tightening fastening bolt 126 (shown in at least FIG. 18b) with nut 120 (shown in at least FIG. 18b), mobile central portion 112 will tend to rotate counter-clockwise when viewed in the direction proceeding from top plane 102 (shown in at least FIG. 16c) to substrate plate 122, until the rotation of mobile central portion 112 is impeded by contact between the edges of radial protrusions 115 and raised hold-downs 117 (assuming right-handed threads). By affixing rigid outer portion 113 to substrate plate 122 as close as possible to the locations where the leading edges of radial protrusions 115 (shown in at least FIG. 16c) contact the edges of raised hold-downs 117, maximum rigidity is achieved, allowing rigid outer portion 113 to be made of thinner material than would be possible if rigid outer portion 113 were affixed to substrate plate 122 at different locations. The relative locations of deformable protrusions 116 are also shown.

FIG. 17 shows downward and cross sectional views of an embodiment of the invention with hardware included. FIG. 17a shows a downward view of the embodiment with hardware included. FIGS. 17b and 17c show cross sections of the embodiment with hardware included. 17 a shows a downward view of nut restrainer 101 with nut 120 included. The relative locations of top plane 102, nut space sidewalls 103, washer space sidewalls 104, mobile central portion 112, rigid outer portion 113, radial protrusions 115, deformable protrusions 116, weld location indicator 118, and restrainer central axis 130 are also shown. The location of section cut plane G is shown in FIG. 14a, and is used in subsequent Figures to identify the orientation of particular cross-sectional views.

FIG. 17b shows a downward cross-sectional view of nut restrainer 101 with nut 120 included. The cross section shown in FIG. 17b is cut through nut space sidewalls 103 of nut restrainer 101. As shown in FIG. 17b, deformable protrusions 116 are configured so that the tips of deformable protrusions 116 must move away from restrainer central axis 130 to accommodate insertion of mobile central portion 112 (shown in its entirety in at least FIG. 16c) into rigid outer portion 113 (shown in at least FIG. 16d), ensuring that mobile central portion 112 is in snug contact with deformable protrusions 116 after mobile central portion 112 is inserted into rigid outer portion 113. The relative location of cavity 133 is also shown. The location of section cut plane G is shown in FIG. 17b, and is used in subsequent figures to identify the orientation of particular cross-sectional views.

FIG. 17c shows a transverse cross-sectional view of nut restrainer 101 with nut 120 and washer 121 included. The location and direction of the cross sectional view through nut restrainer 101 as shown in FIG. 17c is indicated by section G, as shown in at least FIG. 17a. The relative locations of top plane 102, nut space sidewalls 103, washer space sidewalls 104, mobile central portion 112, rigid outer portion 113, radial protrusions 115, deformable protrusions 116, raised hold-downs 117, and restrainer central axis 130 are also shown.

FIG. 18 shows cross-sectional views of an embodiment of the invention with hardware and other elements present, to show methods of alignment and use. FIG. 18a shows the embodiment at the moment of affixment to the substrate plate. FIG. 18b shows the embodiment after installation of the fastening bolt. FIG. 18a shows a transverse cross-sectional view of nut restrainer 101 and other relevant elements at the moment of affixment to substrate plate 122. The location and direction of the cross sectional view through nut restrainer 101 shown in FIG. 18a is indicated by section G, as shown in at least FIG. 17a. As shown in FIG. 18a, the shank of centering bolt 125 is in contact with the walls of substrate bolt hole 123, so that substrate bolt hole central axis 131 and restrainer central axis 130 are offset by a distance substantially equal to the radial tolerance of the bolt hole. In some embodiments, centering bolt 125 and fastening bolt 126 (shown in at least FIG. 18b) may be the same bolt. However, in other cases, the lengths of threaded and unthreaded portions (if present) of the shank of fastening bolt 126 may prevent fastening bolt 126 from being brought into snug contact with nut 120 in the absence of fastened plate 124 (shown in at least FIG. 18b), necessitating the use of a distinct bolt as centering bolt 125. The relative locations of top plane 102, mobile central portion 112, rigid outer portion 113, radial protrusion 115, deformable protrusion 116, raised hold-down 117 and washer 121 are also shown.

FIG. 18b shows a transverse cross-sectional view of nut restrainer 101 and other relevant elements after installation of fastening bolt 126. The location and direction of the cross sectional view through nut restrainer 101 shown in FIG. 18b is indicated by section G, as shown in at least FIG. 17a. As shown in FIG. 18b, fastened plate 124 is positioned such that the shank of fastening bolt 126 is in contact with the interior of substrate bolt hole 123, resulting in substrate bolt hole central axis 131 and fastening bolt central axis 132 being offset by a distance substantially equal to the radial tolerance of the bolt hole. Further, restrainer central axis 130 and fastening bolt central axis 132 are offset in substantially opposite directions from substrate bolt hole central axis 131, such that restrainer central axis 130 and fastening bolt central axis 132 are offset by a distance substantially equal to two times the radial tolerance of the bolt hole. To accommodate this worst-case misalignment, deformable protrusions 116 must be sufficiently flexible to deform when a force in a lateral direction acts on nut 120 due to interaction between nut 120 and the tip of fastening bolt 126. As shown in FIG. 18b, mobile central portion 112 and its contents, nut 120 and washer 121, have moved laterally to accept fastening bolt 126, causing a gap to open between flexible protrusion 116 and mobile central portion 112, and causing radial protrusion 115 to move with respect to raised hold-down 117. The relative locations of top plane 102, rigid outer portion 113, and substrate plate 122, are also shown.

Figures 19A, 19B, 19C, 19D:
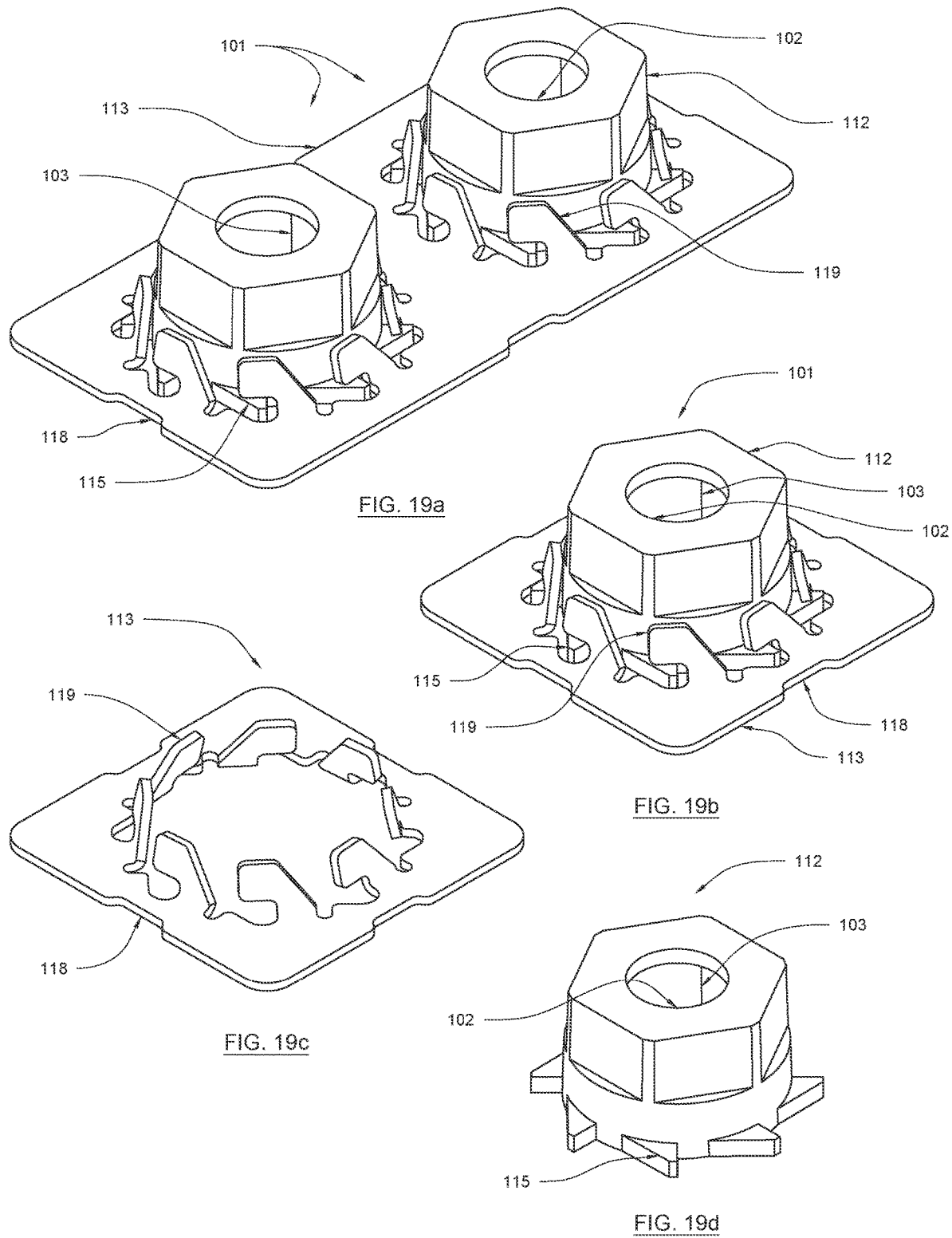
FIG. 19a shows a three-dimensional view of two joined nut restrainers in isolation according to embodiments of the invention.
FIG. 19b shows a three-dimensional view of an embodiment in isolation.
FIGS. 19c and 19d show elements of the embodiment shown in its entirety in FIG. 19b in isolation to present aspects of the embodiment that are not easily visible when the embodiment is shown in its entirety.

FIG. 19 shows various views of exemplary embodiments of the invention. FIG. 19a shows a three-dimensional view of two joined nut restrainers in isolation according to embodiments of the invention. FIG. 19b shows a three-dimensional view of an embodiment in isolation. FIGS. 19c and 19d show elements of the embodiment shown in its entirety in FIG. 19b in isolation to present aspects of the embodiment that are not easily visible when the embodiment is shown in its entirety. FIG. 19a shows a three-dimensional view of two joined nut restrainers 101 from the top and side in isolation. The nut restrainers 101 are joined to facilitate installation of two fastening bolts 126 (shown with respect to a similar embodiment in at least FIG. 18b) through adjacent substrate bolt holes 123 (shown with respect to a similar embodiment in at least FIG. 18b) in a single substrate plate 122 (shown with respect to a similar embodiment in at least FIG. 18b). Embodiments with more than two joined nut restrainers in linear, grid or other arrangements are also envisioned. In embodiments with multiple nut restrainers arranged in a grid pattern, the weld location indicators may include holes within the joined rigid outer portions, in addition to weld location indicators on the perimeter of the joined rigid outer portion. The relative locations of top plane 102, nut space sidewalls 103, mobile central portion 112, rigid outer portion 113, radial protrusions 115, weld location indicators 118, and raised deformable hold-downs 119 are also shown.

FIG. 19b shows a three-dimensional view of nut restrainer 101 from the top and side in isolation. The embodiment shown in FIG. 19b is identical to that shown in FIG. 19a, except that nut restrainer 101 in FIG. 19b is not joined to any additional nut restrainers. The embodiment shown in FIG. 19b is similar to that shown in FIGS. 16 through 18, but whereas the embodiment shown in FIGS. 16 through 18 has deformable protrusions and raised hold-downs that are distinct portions of material, the embodiment shown in FIG. 19b includes several raised deformable hold-downs 119, each performing the functions of both the flexible protrusions and the raised portions shown in FIGS. 16 through 18. As shown in FIG. 19b, radial protrusions 115 and raised deformable hold-downs 119 are configured to resist torque applied in the direction corresponding to tightening fastening bolt 126 (shown with respect to a similar embodiment in at least FIG. 18b) with nut 120 (shown with respect to a similar embodiment in at least FIG. 18b) (assuming right-handed threads). The relative locations of top plane 102, nut space sidewalls 103, mobile central portion 112, rigid outer portion 113, and weld location indicators 118 are also shown.

FIG. 19c shows a three-dimensional view of rigid outer portion 113 from the top and side in isolation. As shown in FIG. 19c, the outside edge of rigid outer portion 113 is a square with rounded corners and indentations in each of the four edges, the indentations serving as weld location indicators 118. In applications requiring multiple fastening bolts 126 (shown with respect to a similar embodiment in at least FIG. 18b) in a linear or grid-like arrangement, substrate bolt holes 123 (shown with respect to a similar embodiment in at least FIG. 18b) may be spaced at intervals substantially equal to the outer width of rigid outer portion 113, so that weld location indicators 118 of adjacent nut restrainers 101 (shown in its entirety in at least FIG. 19b) coincide, allowing the user to apply weld affixing two nut restrainers 101 to substrate plate 122 (shown with respect to a similar embodiment in at least FIG. 18b) with a single motion. Embodiments with weld location indicators at the corners of the rigid outer portion are also envisioned, and would similarly reduce the amount of welding required to affix adjacent nut restrainers. The relative locations of raised deformable hold-downs 119, are also shown.

FIG. 19d shows a three-dimensional view of mobile central portion 112 from the top and side in isolation. The relative locations of top plane 102, nut space sidewalls 103, and radial protrusions 115 are shown.

As will be realized, the systems and methods disclosed herein are capable of other and different embodiments and its several details may be capable of modifications in various respects, all without departing from the invention as set out in the appended claims. Accordingly, the drawings and description are to be regarded as illustrative in nature and not in a restrictive or limiting sense with the scope of the application being indicated in the claims.

What is claimed:
1. A nut restrainer comprising:
a fixed portion;

a mobile central portion connected to the fixed portion by connectors; and the mobile central portion including a cavity configured to accept insertion of a nut and prevent the nut from rotating relative to the mobile central portion, wherein the nut restrainer is configured to accept insertion of the nut and thereafter the nut restrainer is further configured to be affixed to a substrate plate having two sides, over a bolt hole arranged in the substrate plate and the bolt hole having a radial tolerance; and wherein the nut restrainer further configured for subsequent installation of a bolt having a shank and a tip, from one of the two sides of the substrate plate opposite a side to which the nut restrainer is affixed.

2. The nut restrainer according to claim 1 wherein the connectors are configured to allow lateral movement of the mobile central portion relative to the fixed portion.

3. The nut restrainer according to claim 1
wherein the fixed portion is configured to be attachable to the substrate plate; and
wherein the fixed portion being configured to confine the mobile central portion against the substrate plate once the fixed portion has been attached thereto.

4. The nut restrainer according to claim 1 wherein the nut restrainer is configured to limit relative rotation of the mobile central portion and fixed portion.

5. The nut restrainer according to claim 1, wherein the mobile central portion is structured and configured with a hole configured to allow the tip of the bolt to pass through the hole.

6. The nut restrainer according to claim 1, wherein the connectors are configured to be integral with the fixed portion.

7. The nut restrainer according to claim 1, wherein the connectors are configured to be integral with the mobile central portion.

8. The nut restrainer according to claim 1, wherein a lateral movement of the mobile central portion induces deformation of one or more connectors.

9. The nut restrainer according to claim 1, wherein the cavity is configured to accept insertion of a washer in addition to the nut.

10. The nut restrainer according to claim 1, wherein the fixed portion is configured to be attached to the substrate plate by welding.

11. The nut restrainer according to claim 1, wherein the nut restrainer is configured to allow a nut inserted therein to directly contact the substrate plate.

12. The nut restrainer according to claim 1, wherein the nut restrainer is configured so that no part of the nut restrainer extends past a surface of the substrate plate when attached thereto.

13. The nut restrainer according to claim 1, wherein the nut restrainer is configured to allow the shank of the bolt to directly contact an inner surface of the bolt hole in the substrate plate.

14. The nut restrainer according to claim 1, wherein the mobile central portion and fixed portions are distinct portions of material.

15. The nut restrainer according to claim 1, wherein the nut restrainer is a unitary structure.

16. A nut restrainer configured to accept insertion of a nut and thereafter be affixed to a substrate plate having two sides, over a bolt hole arranged in the substrate plate and the bolt hole having a radial tolerance; and the nut restrainer further configured for subsequent installation of a bolt having a shank and a tip, from one of the two sides of the substrate plate opposite a side to which the nut restrainer is affixed, the nut restrainer comprising:
a fixed portion;
a mobile central portion connected to the fixed portion by connectors; and
the mobile central portion including a cavity configured to accept insertion of a nut and prevent the nut from rotating relative to the mobile central portion,
wherein the fixed portion includes one or more raised elements that are separated from the substrate plate;
wherein a space between the one or more raised elements and the substrate plate being arranged to form one or more recesses; and
wherein the mobile central portion comprises one or more protrusions that extend into the one or more recesses.

17. The nut restrainer according to claim 16, wherein the raised elements are configured as portions of the connectors.

18. A nut restrainer configured to accept insertion of a nut and thereafter be affixed to a substrate plate having two sides, over a bolt hole arranged in the substrate plate and the bolt hole having a radial tolerance; and the nut restrainer further configured for subsequent installation of a bolt having a shank and a tip, from one of the two sides of the substrate plate opposite a side to which the nut restrainer is affixed, the nut restrainer comprising:
a fixed portion;
a mobile central portion connected to the fixed portion by connectors; and
the mobile central portion including a cavity configured to accept insertion of a nut and prevent the nut from rotating relative to the mobile central portion,
wherein the fixed portion is toroidal and the mobile central portion is located substantially within an opening of the fixed portion.

19. The nut restrainer according to claim 18, wherein the connectors are configured to hold the mobile central portion substantially concentric with the fixed portion when no lateral force is applied to the mobile central portion.

20. A nut restrainer configured to accept insertion of a nut and thereafter be affixed to a substrate plate having two sides, over a bolt hole arranged in the substrate plate and the bolt hole having a radial tolerance; and the nut restrainer further configured for subsequent installation of a bolt having a shank and a tip, from one of the two sides of the substrate plate opposite a side to which the nut restrainer is affixed, the nut restrainer comprising:
a fixed portion;
a mobile central portion connected to the fixed portion by connectors; and
the mobile central portion including a cavity configured to accept insertion of a nut and prevent the nut from rotating relative to the mobile central portion,
wherein the fixed portion has re-entrant corners or arcs to indicate a proper location for welds attaching the fixed portion to the substrate plate.

* * * * *